United States Patent
Sakata et al.

(10) Patent No.: US 10,919,445 B2
(45) Date of Patent: Feb. 16, 2021

(54) IRRADIATION CONTROL DEVICE AND IRRADIATION METHOD

(71) Applicant: MITSUBISHI ELECTRIC CORPORATION, Tokyo (JP)

(72) Inventors: Reiko Sakata, Tokyo (JP); Munetaka Nishihira, Tokyo (JP); Masami Aikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/463,227

(22) PCT Filed: Jan. 26, 2017

(86) PCT No.: PCT/JP2017/002795
§ 371 (c)(1),
(2) Date: May 22, 2019

(87) PCT Pub. No.: WO2018/138842
PCT Pub. Date: Aug. 2, 2018

(65) Prior Publication Data
US 2020/0070716 A1    Mar. 5, 2020

(51) Int. Cl.
*B60Q 1/26* (2006.01)
*B60Q 1/50* (2006.01)
(Continued)

(52) U.S. Cl.
CPC ............. *B60Q 1/50* (2013.01); *B60Q 1/22* (2013.01); *B60Q 1/34* (2013.01); *B60Q 2400/20* (2013.01); *B60Q 2400/50* (2013.01)

(58) Field of Classification Search
CPC ... B60Q 1/50; B60Q 1/22; B60Q 1/34; B60Q 2400/20; B60Q 2400/50
(Continued)

(56) References Cited

U.S. PATENT DOCUMENTS 4,737,764 A * 4/1988 Harrison ................. E04F 15/02
340/286.13
2017/0210282 A1* 7/2017 Rodriguez Barros . G03B 21/00
(Continued)

FOREIGN PATENT DOCUMENTS

CN         101718408 A      6/2010
DE   10 2013 005 788 A1    10/2014
(Continued)

OTHER PUBLICATIONS

German Office Action dated May 5, 2020 for Application No. 11 2017 006 529.1, along with an English translation.
(Continued)

*Primary Examiner* — Tanmay K Shah
(74) *Attorney, Agent, or Firm* — Birch, Stewart, Kolasch & Birch, LLP.

(57) ABSTRACT

An irradiation control device is a device configured to control irradiation of light indicating a predetermined intention to a surrounding person, and includes an irradiation control unit configured to perform control to irradiate a first irradiation element, and a second irradiation element, which is irradiated when the first irradiation element is extinguished, and indicates an intention of the irradiation. As a result, light can be irradiated such that the attention of a target person is easily attracted and a delay in understanding by the target person is easily avoided.

19 Claims, 12 Drawing Sheets

(51) Int. Cl.
*B60Q 1/22* (2006.01)
*B60Q 1/34* (2006.01)

(58) Field of Classification Search
USPC .......................................................... 340/469
See application file for complete search history.

(56) References Cited

U.S. PATENT DOCUMENTS

2018/0093607 A1* 4/2018 Omanovic ............... B60Q 1/50
2018/0118099 A1* 5/2018 Kunii .................. B60K 31/0008
2019/0270405 A1* 9/2019 Fukumoto ............... B60R 21/34

FOREIGN PATENT DOCUMENTS

| EP | 2 233 356 A1 | 9/2010 |
|---|---|---|
| JP | 2008-143510 A | 6/2008 |
| JP | 2008-286857 A | 11/2008 |
| JP | 2009-149152 A | 7/2009 |
| JP | 2013-242687 A | 12/2013 |
| JP | 2014-85869 A | 5/2014 |
| JP | 2016-193689 A | 11/2016 |

OTHER PUBLICATIONS

Chinese Office Action and Search Report for Chinese Application No. 201780084157.9 dated Nov. 3, 2020, with English Translation.

* cited by examiner

[P5A1]　　[P5A2]　　[P5A3]　　[P5A4]　　[P5A5]

[P5B1]　　[P5B2]

[P61]　　[P62]

IRRADIATION CONTROL DEVICE AND IRRADIATION METHOD

TECHNICAL FIELD

The present invention relates to an irradiation control device and an irradiation method, which are capable of, by performing a dynamic display on a floor surface or a road surface as a display target, issuing an alert or conveying a guidance direction to a user who sees the dynamic display.

BACKGROUND ART

As a related art, there is an alert irradiation control device capable of issuing an alert to a driver and to a person (e.g., see Patent Literature 1). In Patent Literature 1, a level of danger is determined between a vehicle body and a person around the vehicle body, and when there is danger, light is irradiated onto the road surface in accordance with the level of danger. More specifically, in Patent Literature 1, light for displaying a direction of a person, who is estimated to be in danger based on an own vehicle, and a distance from the own vehicle to the person is irradiated onto the road surface.

As another related art, there is an evacuation guidance system enabling, in the event of an emergency, for example, a fire, an evacuation action to be performed quickly and safely by displaying an optimal evacuation direction in accordance with the emergency situation (e.g., see Patent Literature 2).

More specifically, in Patent Literature 2, a plurality of evacuation guidance display devices capable of variably displaying an evacuation direction are arranged on a path to an evacuation site, and the plurality of evacuation guidance display devices are controlled by a guidance lamp control panel. In a normal monitoring state, the guidance lamp control panel permanently displays a predetermined evacuation direction on the guidance display devices. Meanwhile, when an emergency, for example, a fire occurs, the guidance lamp control panel determines the optimum evacuation path based on the occurrence situation of the emergency, and displays an evacuation direction based on the optimum evacuation path on the guidance display devices.

As the specific display content, in Patent Literature 2, there are described displaying an arrow graphic as the evacuation direction, blinking or flickering the displayed graphic, and displaying a moving image. In Patent Literature 2, it is also described that a part of the arrow graphic is repeatedly displayed while the part of the arrow graphic is being moved in the evacuation direction.

CITATION LIST

Patent Literature

[PTL 1] JP 2008-143510 A
[PTL 2] JP 2013-242687 A

SUMMARY OF INVENTION

Technical Problem

However, the related arts have the following problems.

In Patent Literature 1, when an alert is issued from the vehicle, a visible-light animation carried out by, for example, blinking, lighting in turn, or sliding is displayed. Therefore, in Patent Literature 1, the meaning of the alert is easily conveyed, and its visibility is also improved. As used herein, the term "animation" refers to a dynamic display having a display mode that changes over time, such as a display carried out by, for example, blinking, lighting in turn, or sliding, in contrast to a static display in which the same graphic or the like is displayed (irradiated) at the same position without change.

Meanwhile, a driver of a bicycle or a two-wheeled vehicle, who receives the display of the alert, is required to understand the display content of the visible-light animation as soon as possible to take an avoidance action, for example, a brake operation. However, when the visible-light animation has a non-display time, this may delay the understanding of the content by the driver. In Patent Literature 1, there is no consideration given to countermeasures relating to such a delay in content understanding.

In Patent Literature 2, there is employed an animation in which the display blinks, lights in turn, or slides when guidance is conveyed in a building. Therefore, in Patent Literature 2, the guidance direction is easily conveyed, and the visibility is also improved.

Meanwhile, a pedestrian, who receives a guidance display, is walking and moving while looking for guidance. Therefore, when the visible-light animation has a non-display time even for a moment, the guidance may be overlooked.

The present invention has been made to solve the problems described above, and it is an object of the present invention to provide an irradiation control device and an irradiation method, which irradiate light such that the attention of a target person is easily attracted and a delay in understanding by the target person is easily avoided.

Solution to Problem

According to one embodiment of the present invention, there is provided an irradiation control device, which is configured to control irradiation of light indicating a predetermined intention to a surrounding person, the irradiation control device including an irradiation control unit configured to perform control to irradiate a first irradiation element, and a second irradiation element, which is irradiated when the first irradiation element is extinguished, and indicates an intention of the irradiation.

According to another embodiment of the present invention, there is provided an irradiation method for irradiating light indicating a predetermined intention to a surrounding person, the irradiation control method including: irradiating a first irradiation element; and irradiating a second irradiation element, which is irradiated when the first irradiation element is extinguished, and indicates an intention of the irradiation.

Advantageous Effects of Invention

According to the embodiments of the present invention, it is possible to obtain the irradiation control device and the irradiation method, which irradiate light such that the attention of a target person is easily attracted and a delay in understanding by the target person is easily avoided.

DESCRIPTION OF EMBODIMENTS

Now, an irradiation control device and an irradiation method according to exemplary embodiments of the present invention are described with reference to the drawings.

In the following, the exemplary embodiments of the present invention are divided into first to third embodiments for detailed description. In those embodiments, in order to improve visibility and ease of understanding by a person who receives information, a visible-light animation, which is a graphic of animated light, is displayed or projected in such a manner as to enable implementation of a state in which a display element indicating an intention of conveyance content can be visually recognized constantly by the eyes of a user.

In the following description, the "constant display" means a display in which a display element indicating the intention of the conveyance content is visually recognized by the eyes of the user as being displayed constantly. Therefore, it is possible that the actual light source blinks at a speed that cannot be seen by the human eye. The display elements are not always limited to be the same, and may be configured such that the user visually recognizes that at least one display element is displayed among a plurality of display elements indicating the intention of the conveyance content. Further, for example, this concept includes, when there are two display elements indicating the intention of the conveyance content, not only a case in which one of the two display elements is irradiated at a timing at which the other of the two display elements is extinguished, but also a case in which both display elements are simultaneously irradiated and then one of the display elements is irradiated so as to implement a constant display.

First Embodiment

In a first embodiment of the present invention, there is described as an example a case in which a visible-light animation is projected or displayed from an automobile onto a road surface or a vehicle body to urge surrounding people to take care.

First, a hardware configuration is described.

Figure 1:
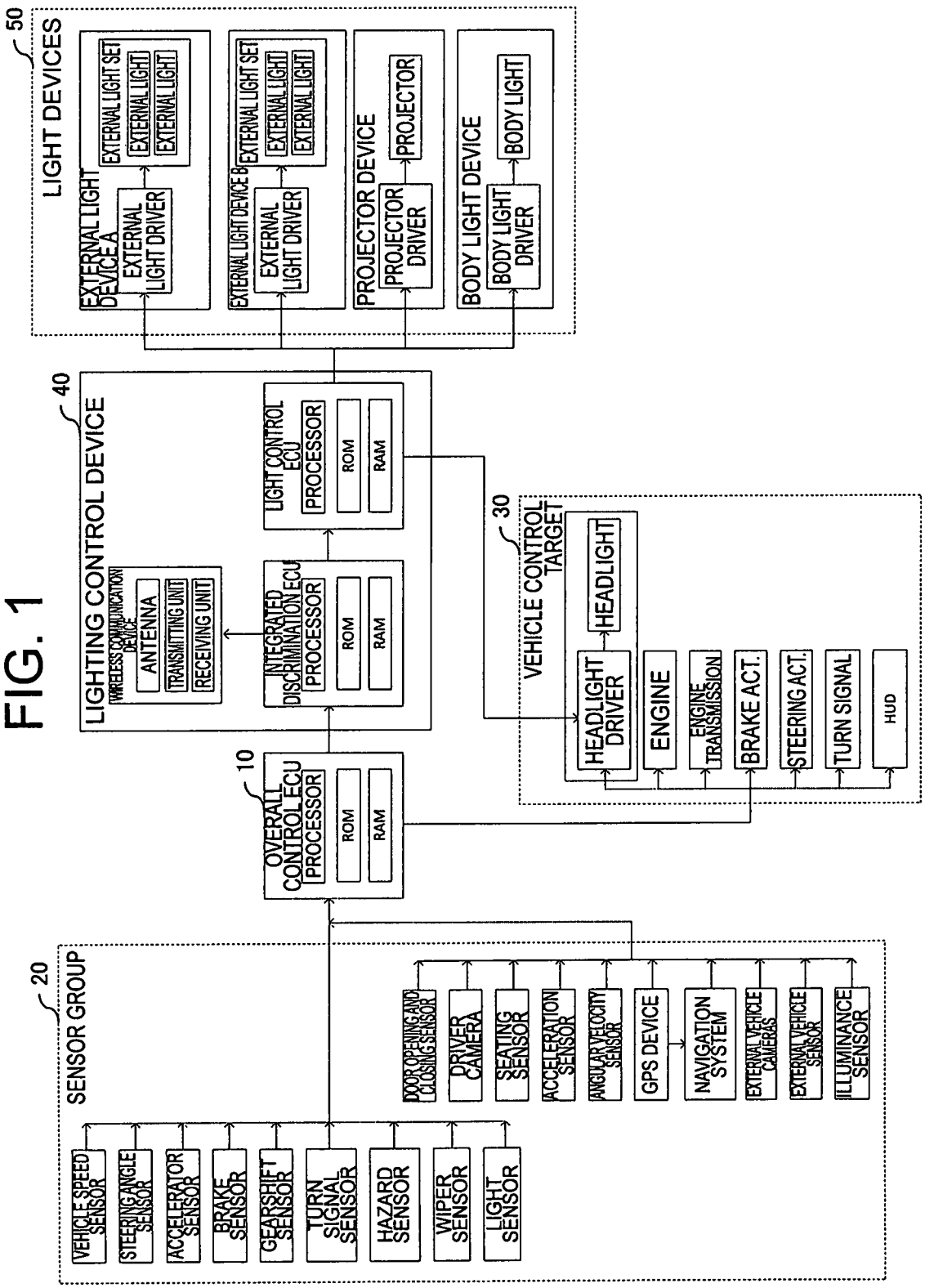
FIG. 1 is a block diagram for illustrating a configuration diagram of hardware in a first embodiment of the present invention.

FIG. 1 is a block diagram for illustrating a configuration diagram of hardware in the first embodiment of the present invention. As illustrated in FIG. 1, an automobile in the first embodiment has a sensor group 20 including various sensors, cameras, and the like. An overall control electronic control unit (ECU) 10 can control the hardware by transmitting various instructions to other hardware based on information obtained from the various sensors in the sensor group 20.

The overall control ECU 10 transmits predetermined information received from other hardware to an integrated discrimination ECU included in a lighting control device 40 via a controller area network (CAN). The lighting control device 40 controls light devices 50 for the outside of the vehicle, such as an external light device A, an external light device B, a projector device, and a body light device, based on the information received from the overall control ECU 10.

In FIG. 1, the various sensors include a vehicle speed sensor, a steering angle sensor, an accelerator sensor, a brake sensor, a gearshift sensor, a turn signal sensor, a hazard sensor, a wiper sensor, a light sensor, a door opening and closing sensor, a driver camera, a seating sensor, an acceleration sensor, an angular velocity sensor, a GPS device, a navigation system, external vehicle cameras, an external vehicle sensor, and an illuminance sensor.

The overall control ECU 10 receives information detected by each sensor and images photographed by the cameras.

The various sensors included in the sensor group 20 are now described.

The vehicle speed sensor detects a speed of the vehicle body. The vehicle speed sensor outputs an electric signal (corresponding to a vehicle speed pulse) corresponding to the wheel speed to the overall control ECU 10.

The steering angle sensor detects a steering angle of the vehicle body. The steering angle sensor outputs an electric signal corresponding to the steering angle to the overall control ECU 10.

The accelerator sensor detects an accelerator opening degree, that is, an operation amount of an accelerator pedal. The accelerator sensor outputs information on the operation amount of the accelerator pedal to the overall control ECU 10.

The brake sensor detects an operation amount of the brake pedal. The brake sensor outputs operation amount information on the brake pedal to the overall control ECU 10.

The gearshift sensor detects a current state or a change of a gearshift lever. The gearshift sensor outputs information on the operation of the gearshift lever caused by a gearshift change or the like by the user to the overall control ECU 10.

The turn signal sensor detects operation of a turn signal (direction indicator). When the user operates the turn signal, the turn signal sensor outputs information on the turn signal operation instruction to the overall control ECU 10.

The hazard sensor detects operation of a hazard switch. The hazard sensor detects operation of the hazard switch by the user, and outputs information on the detected operation to the overall control ECU 10.

The wiper sensor detects operation of wipers. When the user operates the wipers, the wiper sensor outputs information on the operation instruction to the overall control ECU 10.

The light sensor detects operation of a light lever by the user. The light sensor outputs information on the light operation by the user to the overall control ECU 10.

The door opening and closing sensor detects opening and closing of a door of the vehicle. The door opening and closing sensor outputs information on the door opening and closing to the overall control ECU 10.

The driver camera is a camera (image pickup device) arranged so as to face a driver's seat of the vehicle. The driver camera has a function of photographing a user who sits in the driver's seat. The driver camera photographs the face and upper body of the user, and outputs the photographed image to the overall control ECU 10.

The seating sensor is arranged on the seat, and detects a seating situation of the user. The seating sensor is implemented by, for example, a pressure sensor. The seating sensor outputs to the overall control ECU 10 information indicating that the user is seated or has left the seat. A plurality of seating sensors may be arranged on the seat. The overall control ECU 10 can also estimate a posture and the like of the user based on information from a plurality of pressure sensors.

The acceleration sensor detects an acceleration of the vehicle. The acceleration sensor is configured from, for example, a triaxial acceleration sensor. The acceleration sensor outputs information on the acceleration of the vehicle to the overall control ECU 10.

The angular velocity sensor detects an angular velocity (gyro). The angular velocity sensor outputs the information on the detected angular velocity to the overall control ECU 10. The overall control ECU 10 can detect a turning speed and the like of the vehicle based on the angular velocity information.

The GPS device is a device configured to use the global positioning system (GPS) to detect a position of an own vehicle by using radio waves transmitted by satellites. The GPS device outputs the coordinates of the position of the own vehicle to the overall control ECU 10 and the navigation system.

The navigation system has map information. The navigation system has a function of calculating a recommended path to a destination of the vehicle based on the own-vehicle position and the map information. The navigation system also has a communication function. External information such as congestion information and road closure information may be acquired from a server, and the recommended path may be calculated based on the external information.

The navigation system may also have a function of transmitting to the server the position information on the vehicle, the destination information, and other such information. In this case, the navigation system may be configured such that the recommended path is calculated on the server side, and the information on the recommended path is received by the navigation system. The navigation system outputs the information on the calculated path to the overall control ECU 10.

The external vehicle cameras are cameras (image pickup devices) arranged in order to photograph the outside of the vehicle. The external vehicle camera is arranged, for example, at each of the front, rear, left, and right of the vehicle. Each photographed image is output to the overall control ECU 10. The overall control ECU 10 can detect and recognize people, and detect and recognize objects (objects) such as vehicles and obstacles, based on those photographed images.

The external vehicle sensor is a sensor capable of detecting objects around the outside of the vehicle. The external vehicle sensor includes, for example, an ultrasonic sensor, a radar sensor, a millimeter wave radar sensor, or an infrared laser sensor. The external vehicle sensor outputs the detection information to the overall control ECU 10. The overall control ECU 10 can detect, based on the detection information on an object outside the vehicle input from the external vehicle sensor, a distance between the object and the vehicle and the position of the object.

The detected distance and position of the object may be detected by the overall control ECU 10 like in the first embodiment, or the external vehicle sensor may calculate the distance and position of the object based on the information detected by the external vehicle sensor itself, and output the calculated information to the overall control ECU 10.

The illuminance sensor is arranged so as to face outside from the vehicle. The illuminance sensor detects illuminance (brightness) outside the vehicle. The illuminance sensor outputs information on the detected illuminance to the overall control ECU 10.

Next, the overall control ECU 10 is described.

The overall control ECU 10 is an ECU having a function of controlling the entire vehicle. The overall control ECU 10 acquires the detection information from the various sensors, and based on the acquired information, executes control of the entire vehicle by transmitting instructions and information to appropriately operate each unit of the vehicle.

The overall control ECU 10 includes a processor, a read-only memory (ROM), and a random-access memory (RAM). The processor is an arithmetic processing circuit configured to execute various types of arithmetic processing in the overall control ECU 10. The processor is hardware that can also be referred to by various designations in addition to the processor, such as an arithmetic processing circuit, an electric circuit, and a controller.

The processor is built from one or a collection of two or more arithmetic processing circuits. The processor can execute arithmetic processing by reading a program from the ROM and loading the read program onto the RAM.

The ROM is a nonvolatile storage device storing one or more programs. The RAM is a volatile storage device to be used as an area onto which programs and various types of information are to be loaded by the processor. The ROM and the RAM are built from, for example, a semiconductor storage device, and can also be referred to as "memory".

In the first embodiment, there is described an example in which the ROM is a storage device storing a program to be executed by the processor, but the storage device is not limited to this, and may be, for example, a nonvolatile mass storage device referred to as "storage", such as a hard disk drive (HDD) or a solid-state drive (SSD).

The storage devices including a storage may be collectively referred to as "memory". The configuration of such a memory is the same for the integrated discrimination ECU and the light control ECU, which are described later.

Next, each constituent component of a vehicle control target 30 in FIG. 1 is described.

A headlight driver is a driving device configured to drive headlights. The headlight driver drives, based on an instruction from the overall control ECU 10 or the light control ECU, the head lights and causes the headlights to perform operations such as turning on/off and switching between high beam and low beam.

The headlights are arranged on the front side of the vehicle body. The headlights are irradiation devices configured to irradiate the light toward the front of the vehicle body. The headlight is arranged at each of the left and the right front sides of the vehicle body. The headlights are capable of switching between a high beam for illuminating further away and a low beam for illuminating closer than the high beam by switching the structure of a light guidance portion for guiding the light irradiated from the lights, or by switching among a plurality of lights.

An engine is an internal combustion engine configured to generate motive power to drive the vehicle. The engine generates motive power for rotating the wheels by burning fuel, for example, gasoline. The engine can also operate based on an instruction from the overall control ECU 10.

An engine transmission includes gears, shafts, and the like, and has a function of transmitting motive power to the wheels. The engine transmission can change a torque to be transmitted to the wheels by changing the gears based on an instruction from the overall control ECU 10.

A brake actuator is a mechanism for operating brakes (speed reducers) in order to cause the vehicle to decelerate.

The brake actuator can cause the vehicle to decelerate by operating the brakes based on an instruction from the overall control ECU 10.

A steering actuator is a mechanism for operating a steering system (steering device) configured to control the travel direction of the vehicle by changing the direction of the wheels. The steering actuator can control the travel direction of the vehicle by controlling the steering system based on an instruction from the overall control ECU 10.

A turn signal is a direction indicator for indicating to the outside of the vehicle the travel direction of the vehicle by light emission. The turn signal blinks based on an instruction from the overall control ECU 10 to indicate the travel direction of the vehicle to the outside of the vehicle.

A head-up display (HUD) is a transmissive image display apparatus arranged so as to be superimposed on a windshield of the automobile. The HUD can display various images based on an instruction from the overall control ECU 10. The HUD presents various types of information to the user in the vehicle by displaying an image.

Next, each constituent component of the lighting control device 40 in FIG. 1 is described.

The lighting control device 40 is a control device having a function of controlling the light devices of the vehicle. The lighting control device 40 includes an integrated discrimination ECU, a wireless communication device, and a light control ECU.

The vehicle in the first embodiment has a function of conveying the state of the vehicle, an operation intention, a warning, other such information to the surroundings of the vehicle based on the irradiation of light of various light devices. The term "light devices" in this case refers to the light devices 50, which is a collective term for the external light device A, the external light device B, the projector device, the body light device, and the headlights described later.

The integrated discrimination ECU is a device having a function of discriminating the situation of the vehicle body based on various types of information input from the overall control ECU 10, and determining the content to be conveyed to the surroundings by the light devices 50. Like the overall control ECU 10, the integrated discrimination ECU includes a processor, a ROM, and a RAM.

The integrated discrimination ECU receives various types of information from the overall control ECU 10 to determine the state of the vehicle, and transmits information for controlling the irradiation of each light device to the light control ECU. The integrated discrimination ECU also transmits to the wireless communication device an instruction relating to communication.

The wireless communication device is a communication device configured to perform wireless communication to and from an external communication device. The wireless communication device uses a specific frequency band to perform vehicle-to-vehicle communication to and from another car, road-to-vehicle communication to and from a roadside device, and communication to and from a communicable electronic device carried by a person, for example, a smartphone.

This communication may be unique communication using a specifically determined frequency band, or may be communication using a communication standard standardized to execute communication between an in-vehicle communication device and an external communication device. This communication may also be communication using existing communication standards such as wireless local area network (LAN), Bluetooth (trademark), and Zigbee (trademark).

The wireless communication device transmits wireless signals from a transmitting unit to another device via an antenna, and receives wireless signals from another device from a receiving unit via the antenna.

The light control ECU is a control device configured to determine the light to be irradiated by each light device and transmit an instruction to the light devices 50. The light control ECU includes a processor, a ROM, and a RAM. The light control ECU determines an irradiation pattern of each light device based on information input from the integrated discrimination ECU, and transmits an irradiation instruction to each light device based on the determined irradiation pattern.

In this case, the "irradiation pattern" refers to a pattern formed from one display element or from a combination of two or more display elements. The irradiation pattern has adjustable elements, such as an irradiation shape, position, size, color, timing, brightness, and duration, which enables the visibility of the pattern to be changed in accordance with a peripheral environment under which the pattern is to be displayed.

Next, each constituent component of the light devices 50 in FIG. 1 is described.

The external light device A is an irradiation device mounted so as to face the outside from the vehicle body. The external light device A has a function of irradiating light onto the road surface or a nearby wall surface to convey, to a user who is outside the vehicle, information such as an advance notice of an upcoming operation of the vehicle, an intention of a current or upcoming vehicle operation, and a warning. The external light device A irradiates the light onto the road surface or the like in an irradiation pattern suitable for conveying such information to a user outside the vehicle.

The external light device A includes an external light driver and an external light set. The external light driver is a driving device configured to drive the external light set to cause the external light set to irradiate predetermined light.

The external light driver A has a function of controlling a combination of an irradiation timing, an irradiation time, and the like of each external light in the external light set. The external light driver A can also operate a color filter, a shade, a light guiding mechanism, and the like arranged in the external lights to irradiate light having the predetermined irradiation pattern onto a position relative to a predetermined vehicle body.

An external light set A includes a plurality of external lights (irradiation devices). A plurality of external lights are turned on based on control by the external light driver.

The external light device B is an irradiation device mounted so as to face the outside from the vehicle body. The external light device B has a function of irradiating light onto the road surface or a nearby wall surface to convey, to a user who is outside the vehicle, information such as an advance notice of an upcoming operation of the vehicle, an intention of a current or upcoming operation, and a warning. The external light device B irradiates the light onto the road surface or the like in an irradiation pattern suitable for conveying such information to a user outside the vehicle.

The external light device B includes an external light driver and an external light set. The external light driver is a driving device configured to drive the external light set to cause the external light set to irradiate predetermined light.

The external light driver B has a function of controlling a combination of an irradiation timing, an irradiation time, and the like of each external light in the external light set. The external light driver B can also operate a color filter, a shade, and a light guiding mechanism arranged in the external lights to irradiate light having the predetermined irradiation pattern onto a position relative to a predetermined vehicle body.

An external light set B includes a plurality of external lights (irradiation devices). A plurality of external lights are turned on based on control by the operation of the external light driver.

The projector device is an image projection device mounted so as to face the outside from the vehicle body. The projector device has a function of irradiating light onto the road surface or a nearby wall surface to convey, to a user who is outside the vehicle, information such as an advance notice of an upcoming operation of the vehicle, an intention of a current or upcoming vehicle operation, and a warning. The projector device irradiates (projects) the light onto the road surface or the like in an irradiation pattern suitable for conveying such information to a user outside the vehicle.

The projector device includes a projector driver and a projector. The projector driver is a driving device configured to drive the projector to cause the projector to irradiate predetermined light. The projector driver has a function of controlling the irradiation pattern of the light to be irradiated by the projector.

The projector is an irradiation (projection) device configured to irradiate (project) light (image) toward the outside of the vehicle. The projector irradiates light (image) onto the road surface or a wall surface outside the vehicle based on the operation of the projector driver.

The body light device is a light emitting device arranged on the vehicle body. The body light device has a function of conveying, to a pedestrian outside the vehicle or a driver of another vehicle, for example, information such as an advance notice of an upcoming operation of the vehicle, an intention of a current or upcoming operation, and a warning. The body light device emits light having a predetermined irradiation pattern on a predetermined position onto the surface of the vehicle body.

The body light device includes a body light driver and a body light. The body light driver is a driving device configured to drive the body light to cause the body light to irradiate light having a predetermined irradiation pattern. The body light driver has a function of controlling the irradiation pattern of the light to be irradiated by the body light.

The body light is a light emitting device arranged such that light emitted from the outer surface of the vehicle body can be seen. The body light in the first embodiment is formed by a liquid crystal display (LCD) and light emitting diodes (LED).

The body light irradiates light emitted by the LEDs and transmitted through the LCD onto the outside of the vehicle as light having a predetermined pattern. In the first embodiment, there is described an example in which the body light is formed by LEDs and an LCD, but the present invention is not limited to this example. The body light may be formed by another light emitting device that uses, for example, organic electroluminescence (EL), and a display device.

Next, details of the specific control processing by the lighting control device 40 are described.

Figure 2:
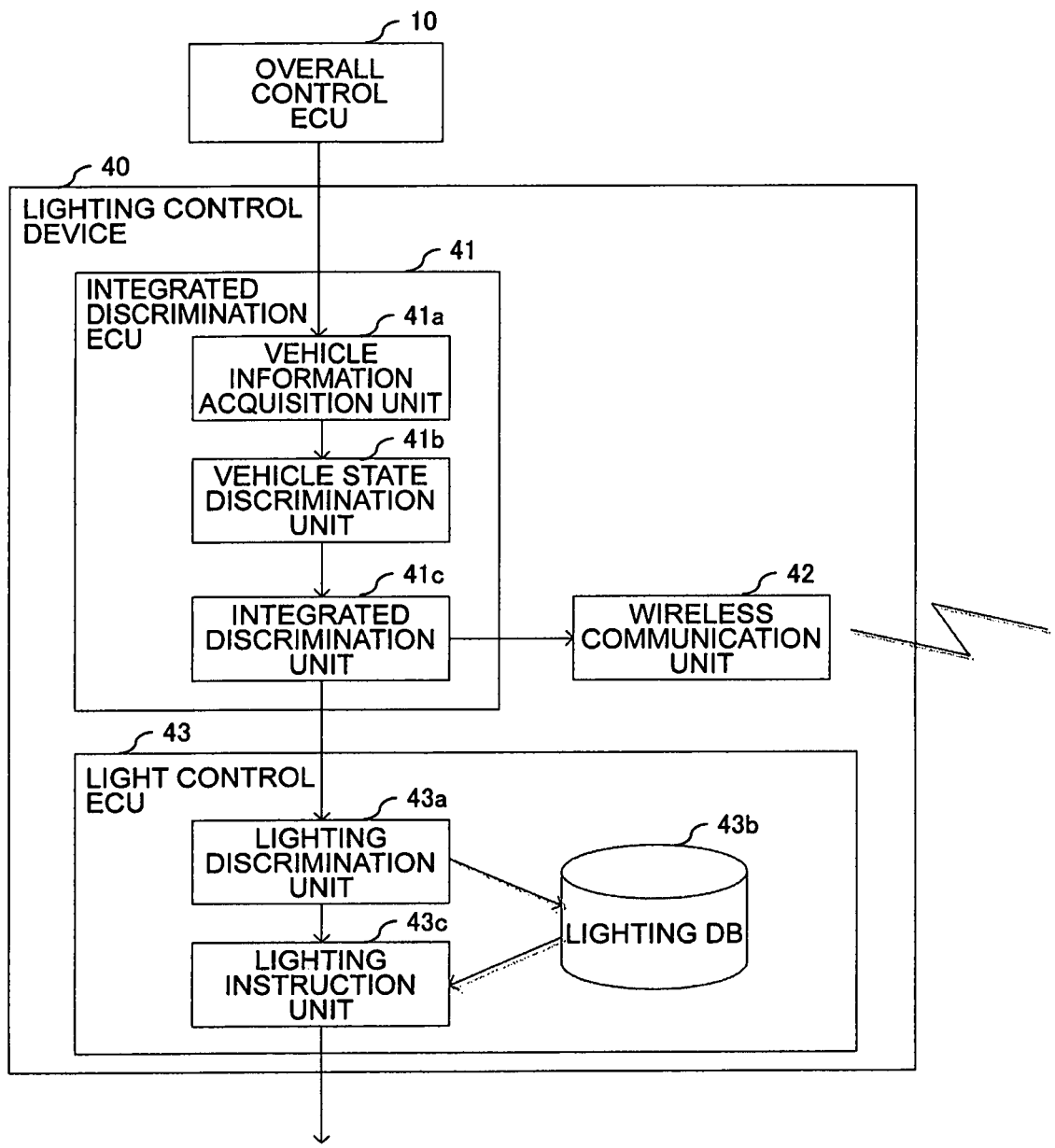
FIG. 2 is a block diagram for illustrating a functional configuration of a lighting control device in the first embodiment of the present invention.

FIG. 2 is a block diagram for illustrating a functional configuration of the lighting control device 40 in the first embodiment of the present invention. The lighting control device 40 in the first embodiment includes an integrated discrimination ECU 41, a wireless communication unit 42, and a light control ECU 43.

The integrated discrimination ECU 41 in the lighting control device 40 includes a vehicle information acquisition unit 41a, a vehicle state discrimination unit 41b, and an integrated discrimination unit 41c. The light control ECU 43 in the lighting control device 40 includes a lighting discrimination unit 43a, a lighting database (lighting DB) 43b, and a lighting instruction unit 43c.

The vehicle information acquisition unit 41a has a function of acquiring various types of information from the overall control ECU 10. Examples of the information to be acquired by the vehicle information acquisition unit 41a include information on switching between ON/OFF of the engine, information on a gear change by the gearshift lever, information on door opening and closing, information on vehicle operation, information on a steering angle of a steering wheel, information on operation of the turn signal, detection information and recognition information on objects such as surrounding people and vehicles, and information on users inside the vehicle. The vehicle information acquisition unit 41a transmits the acquired information to the vehicle state discrimination unit 41b.

The vehicle state discrimination unit 41b has a function of discriminating the state of the vehicle based on the information received from the vehicle information acquisition unit 41a. For example, the vehicle state discrimination unit 41b discriminates, based on the gear change information, whether or not the vehicle is stationary, about to move forward, or about to reverse.

The vehicle state discrimination unit 41b also discriminates, based on the information on the steering angle of the steering wheel and the information on the operation of the turn signal, whether or not the vehicle is about to turn to the right or to the left. The vehicle state discrimination unit 41b also discriminates, based on the detection information and recognition information on objects such as surrounding people and vehicles, whether the vehicle, surrounding people, another vehicle, and the like are in danger.

The integrated discrimination unit 41c has a function of discriminating information to be conveyed to the outside of the vehicle based on the discrimination result of the vehicle state discrimination unit 41b. For example, when the vehicle is about to reverse, the integrated discrimination unit 41c determines that a message indicating that the vehicle is to reverse is to be conveyed to the outside of the vehicle, and transmits to the lighting discrimination unit 43a an instruction for irradiation of that message.

When the gearshift lever is changed from parking to drive (or first gear), the vehicle state discrimination unit 41b determines that the vehicle is about to move forward from a stationary state, and transmits this information to the integrated discrimination unit 41c. The integrated discrimination unit 41c transmits, based on this information, to the lighting discrimination unit 43a an instruction to perform irradiation to the effect that the vehicle is about to move forward from a stationary state.

The integrated discrimination unit 41c also has a function of controlling wireless communication based on the discrimination result of the vehicle state discrimination unit 41b. The wireless communication unit 42 executes wireless communication to and from an external device in accordance with an instruction from the integrated discrimination unit 41c.

When the lighting discrimination unit 43a in the light control ECU 43 receives the information to be conveyed to the outside of the vehicle from the integrated discrimination unit 41c, the lighting discrimination unit 43a refers to the lighting DB 43b and discriminates a suitable lighting irradiation pattern for the information to be conveyed to the outside of the vehicle.

The lighting DB 43b is a database containing information on various kinds of lighting. For example, the lighting DB 43b stores a lighting identifier, a light device identifier (external light device A, external light device B, projector device, body light device, headlights), an irradiation pattern of light that can be irradiated by a corresponding light device, and the content to be conveyed to the surroundings by that irradiation pattern.

The lighting instruction unit 43c has a function of controlling each light device by transmitting an irradiation instruction to each light device in accordance with an instruction from the lighting discrimination unit 43a. For example, when an irradiation instruction for a predetermined purpose has been issued from the integrated discrimination unit 41c, the lighting discrimination unit 43a refers to the lighting DB 43b to discriminate a lighting identifier suitable for the irradiation instruction for the predetermined purpose.

There may be one or a plurality of discriminating lighting identifiers. The lighting discrimination unit 43a determines the identifier of the lighting to be irradiated, and then determines the irradiation timing and duration of the determined lighting. The lighting discrimination unit 43a notifies the lighting instruction unit 43c of the identifier and information on the irradiation timing and duration of the lighting.

The lighting instruction unit 43c has a function of controlling the irradiation of light by each light device by referring to the lighting DB 43b based on the information received from the lighting discrimination unit 43a.

In the first embodiment, there is described an example in which the integrated discrimination ECU 41 and the light control ECU 43 are separate ECUs, but those units may be integrated.

Next, the visible-light animations to be projected and displayed from the automobile toward the road surface or the vehicle body are described in detail with reference to the drawings. In the first embodiment, there are described specific examples of visible-light animations corresponding to the following three cases. In the following description, the display control is described as being performed by the lighting control device 40, and a description of the control operations performed by each constituent component in the lighting control device 40 illustrated in FIG. 2 is omitted.

[Case 1] Visible-light animation corresponding to door opening operation

[Case 2] Visible-light animation corresponding to reverse, start, right turn, or left turn

[Case 3] Visible-light animation combining special icons

[Case 1] Visible-light animation corresponding to door opening operation

The aim of Case 1 is to perform a visible-light animation to issue, in response to the opening of a door of a stationary vehicle (before door opening operation of vehicle), an advance notice or an alert relating to an area in which a person is to exit from the vehicle, an area or space in which the door is to be opened, and the periphery thereof.

Figure 3A:
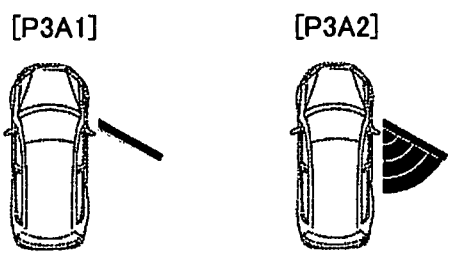
FIG. 3A is a diagram for illustrating an example of a first visible-light animation associated with door opening of pushing out a door in the first embodiment of the present invention.

FIG. 3A is a diagram for illustrating an example of a first visible-light animation associated with door opening of pushing out a door in the first embodiment of the present invention. In FIG. 3A, there is illustrated a state in which a dynamic display is performed by sequentially switching between the following two types of displays of P3A1 and P3A2.

P3A1: Display enabling opening of door to be visualized

P3A2: Display corresponding to an entire area in which the door moves when the door moves from a closed state to the state of P3A1

The display of P3A1 in FIG. 3A corresponds to a display element indicating the intention of the conveyance content. The lighting control device 40 repeatedly blinks the displays of P3A1 and P3A2. At this time, the state of P3A1, which is a display element indicating the intention of the conveyance content, is also included in the display of P3A2. Therefore, even when the displays of P3A1 and P3A2 are sequentially switched, a person or a driver around the vehicle can constantly visually recognize P3A1, which is a display element indicating the intention of the conveyance content, at all times.

As a result, the lighting control device 40 can execute a visible-light animation display that enables a person or a driver around the vehicle to quickly understand the conveyance content without a risk of the display of P3A1 being overlooked.

Figure 3B:
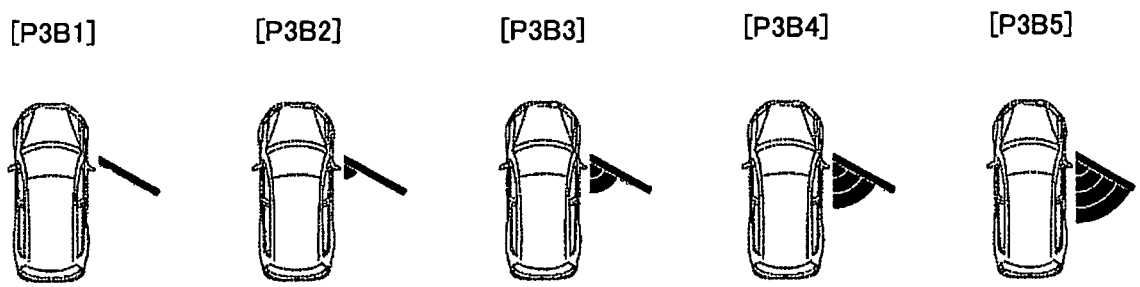
FIG. 3B is a diagram for illustrating an example of a second visible-light animation associated with door opening of pushing out a door in the first embodiment of the present invention.

FIG. 3B is a diagram for illustrating an example of a second visible-light animation associated with door opening of pushing out a door in the first embodiment of the present invention. In FIG. 3B, there is illustrated a state in which a dynamic display is performed by sequentially switching between the following five types of displays of P3B1 to P3B5.

P3B1: Display enabling opening of door to be visualized, and is same display as P3A1 of FIG. 3A P3B2 to P3B5: Displays obtained by dividing an area in which the door moves into four stages when the door moves from a state in which the door is closed to the state of P3B1, and correspond to the display of P3A2 of FIG. 3A divided into four stages The display of P3B1 in FIG. 3B corresponds to a display element indicating the intention of the conveyance content. The lighting control device 40 repeatedly blinks the displays of P3B1 to P3B5. At this time, the state of P3B1, which is a display element indicating the intention of the conveyance content, is also included in the displays of P3B2 to P3B5. Therefore, even when the displays of P3B1 to P3B5 are sequentially switched, a person or a driver around the vehicle can constantly visually recognize P3B1, which is a display element indicating the intention of the conveyance content, at all times.

As a result, the lighting control device 40 can execute a visible-light animation display that enables a person or a driver around the vehicle to quickly understand the conveyance content without a risk of the display of P3B1 being overlooked.

Figure 3C:
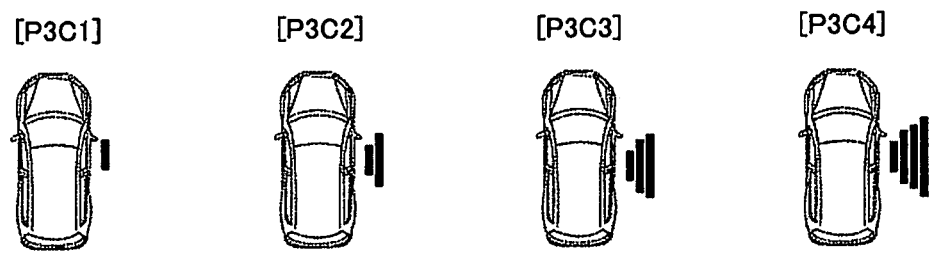
FIG. 3C is a diagram for illustrating an example of a visible-light animation associated with opening of a sliding type door in the first embodiment of the present invention.

FIG. 3C is a diagram for illustrating an example of a visible-light animation associated with opening of a sliding type door in the first embodiment of the present invention. In FIG. 3C, there is illustrated a state in which a dynamic display is performed by sequentially switching between the following four types of displays of P3C1 to P3C4.

P3C1: Display enabling an area in which a person is to exit from the vehicle after the door has been slid open to be visualized P3C2 to P3C4: Displays enabling an area in which a person who has exited from the vehicle gradually moves from the vehicle side toward the outside, and correspond to displays divided into three stages The display of P3C1 in FIG. 3C corresponds to a display element indicating the intention of the conveyance content. The lighting control device 40 repeatedly blinks the displays of P3C1 to P3C4. At this time, the state of P3C1, which is a display element indicating the intention of the conveyance content, is also included in the displays of P3C2 to P3C4. Therefore, even when the displays of P3C1 to P3C4 are sequentially switched, a person or a driver around the vehicle can constantly visually recognize P3C1, which is a display element indicating the intention of the conveyance content, at all times.

As a result, the lighting control device 40 can execute a visible-light animation display that enables a person or a driver around the vehicle to quickly understand the conveyance content without a risk of the display of P3C1 being overlooked.

In FIG. 3C, there is illustrated a case in which the position closest to the sliding type door of the vehicle can be constantly visually recognized in P3C1 to P3C4, but the present invention is not limited to such a visible-light animation display. For example, the same effect can be implemented by displaying a visible-light animation that enables the farthest position from the sliding type door of the vehicle to be constantly visually recognized.

[Case 2] Visible-light animation corresponding to reverse, start, right turn, or left turn The aim of Case 2 is to perform a visible-light animation to issue, when the vehicle is to move (before the vehicle starts moving), an advance notice or an alert of the travel direction and distance of the movement. In this case, the "distance" means, for example, about 3 meters ahead of the vehicle, which corresponds to the distance traveled by a vehicle in 1 second at a speed of 10 km/h, or about 4 m ahead of the vehicle, which corresponds to the length of one vehicle.

Figure 4A:
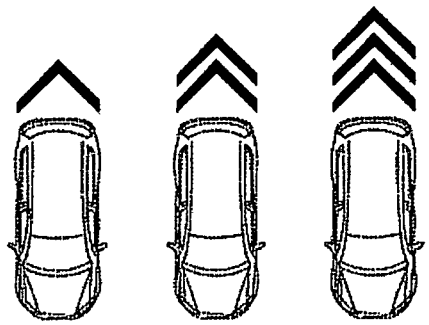
FIG. 4A is a diagram for illustrating an example of a first visible-light animation associated with reversing of a vehicle in the first embodiment of the present invention.

FIG. 4A is a diagram for illustrating an example of a first visible-light animation associated with reversing of the vehicle in the first embodiment of the present invention. In FIG. 4A, there is illustrated a state in which a dynamic display is performed by sequentially switching among the following three types of displays of P4A1 to P4A3.

P4A1: Display enabling an area closest to a rear portion of the vehicle to be visualized, which displays that the vehicle is reversing closer by a chevron mark P4A2 and P4A3: Displays enabling an area in which the vehicle gradually moves over time to be visualized The display of P4A1 in FIG. 4A corresponds to a display element indicating the intention of the conveyance content. The lighting control device 40 repeatedly blinks the displays of P4A1 to P4A3. At this time, the state of P4A1, which is a display element indicating the intention of the conveyance content, is also included in the displays of P4A2 and P4A3. Therefore, even when the displays of P4A1 to P4A3 are sequentially switched, a person or a driver around the vehicle can constantly visually recognize P4A1, which is a display element indicating the intention of the conveyance content, at all times.

As a result, the lighting control device 40 can execute a visible-light animation display that enables a person or a driver around the vehicle to quickly understand the conveyance content without a risk of the display of P4A1 being overlooked.

Figure 4B:
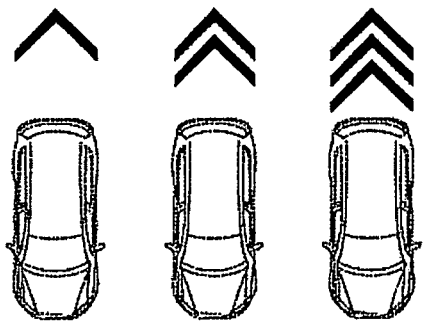
FIG. 4B is a diagram for illustrating an example of a second visible-light animation associated with reversing of the vehicle in the first embodiment of the present invention.
Figure 4C:
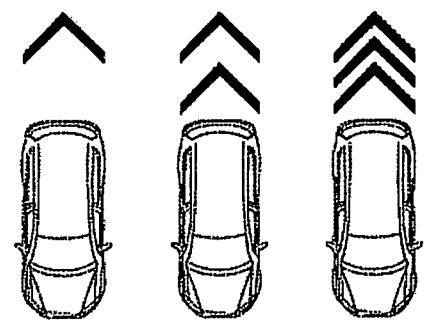
FIG. 4C is a diagram for illustrating an example of a third visible-light animation associated with reversing of the vehicle in the first embodiment of the present invention.

FIG. 4B is a diagram for illustrating an example of a second visible-light animation associated with reversing of the vehicle in the first embodiment of the present invention. FIG. 4C is a diagram for illustrating an example of a third visible-light animation associated with reversing of the vehicle in the first embodiment of the present invention. In FIG. 4B and FIG. 4C, there are illustrated variations, which are different from FIG. 4A, of the area to be constantly displayed and the state that is switched and displayed.

In FIG. 4A, the area closest to the rear portion of the vehicle is constantly displayed. In contrast, in FIG. 4B and FIG. 4C, the maximum area in which the vehicle can move when reversing is constantly displayed. Further, in FIG. 4B and FIG. 4C, a second display pattern P4B2 in FIG. 4B and a second display pattern P4C2 in FIG. 4C are different.

Therefore, in the cases of both FIG. 4B and FIG. 4C, a person or a driver around the vehicle can constantly visually recognize P4B1 or P4C1, which is a display element indicating the intention of the conveyance content, at all times. As a result, the lighting control device 40 can execute a visible-light animation display that enables a person or a driver around the vehicle to quickly understand the conveyance content without a risk of the display of P4B1 or P4C1 being overlooked.

Figure 5A:
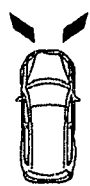
FIG. 5A is a diagram for illustrating an example of a first visible-light animation associated with starting of the vehicle in the first embodiment of the present invention.
Figure 5A:
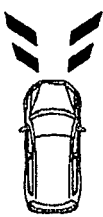
Figure 5A:
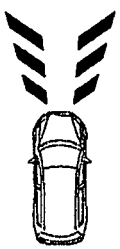
Figure 5A:
Figure 5A:

Next, FIG. 5A is a diagram for illustrating an example of a first visible-light animation associated with starting of the vehicle in the first embodiment of the present invention. In FIG. 5A, there is illustrated a state in which a dynamic display is performed by sequentially switching among the following five types of displays of P5A1 to P5A5.

P5A1: Display enabling an immediate area in front of the vehicle to be visualized, which displays that the vehicle is to move forward by inclining displayed line segments P5A2 to P5A5: Displays enabling an area in which the vehicle gradually moves over time to be visualized, which displays that the vehicle is to move forward by displaying line segments that become longer as the distance from the vehicle becomes larger The display of P5A1 in FIG. 5A corresponds to a display element indicating the intention of the conveyance content. The lighting control device 40 repeatedly blinks the displays of P5A1 to P5A5. At this time, the state of P5A1, which is a display element indicating the intention of the conveyance content, is also included in the displays of P5A2 to P5A5. Therefore, even when the displays of P5A1 to P5A5 are sequentially switched, a person or a driver around the vehicle can constantly visually recognize P5A1, which is a display element indicating the intention of the conveyance content, at all times.

As a result, the lighting control device 40 can execute a visible-light animation display that enables a person or a driver around the vehicle to quickly understand the conveyance content without a risk of the display of P5A1 being overlooked.

Figure 5B:
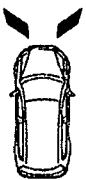
FIG. 5B is a diagram for illustrating an example of a second visible-light animation associated with forward movement of the vehicle in the first embodiment of the present invention.
Figure 5B:
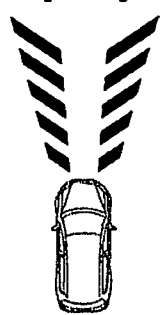

FIG. 5B is a diagram for illustrating an example of a second visible-light animation associated with forward movement of the vehicle in the first embodiment of the present invention. A display of P5B1 in FIG. 5B corresponds to the display of P5A1 in FIG. 5A, and a display of P5B2 in FIG. 5B corresponds to the display of P5A5 in FIG. 5A. Specifically, in FIG. 5A, a display switching among five stages is performed, but in FIG. 5B, a display switching between two stages, namely, a closest area and a maximum area, is performed.

Also in the case of FIG. 5B, a person or a driver around the vehicle can constantly visually recognize P5B1, which is a display element indicating the intention of the conveyance content, at all times. As a result, the lighting control device 40 can execute a visible-light animation display that enables a person or a driver around the vehicle to quickly understand the conveyance content without a risk of the display of P5B1 being overlooked.

Figure 6:
FIG. 6 is a diagram for illustrating an example of a visible-light animation associated with a right turn of the vehicle in the first embodiment of the present invention.
Figure 6:
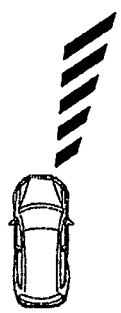

Next, FIG. 6 is a diagram for illustrating an example of a visible-light animation associated with right turning of the vehicle in the first embodiment of the present invention. In FIG. 6, there is illustrated a state in which a dynamic display is performed by sequentially switching among the following two types of displays of P61 and P62.

P61: Display enabling a right immediate area in front of the vehicle to be visualized, which displays that the vehicle is to move forward and turn right by inclining displayed line segments P62: Displays enabling a maximum area in which the vehicle gradually moves over time to be visualized, which displays that the vehicle is to turn right by displaying line segments that become longer as the distance from the vehicle becomes larger The display of P61 in FIG. 6 corresponds to a display element indicating the intention of the conveyance content. The lighting control device 40 repeatedly blinks the displays of P61 and P62. At this time, the state of P61, which is a display element indicating the intention of the conveyance content, is also included in the display of P62. Therefore, even when the displays of P61 and P62 are sequentially switched, a person or a driver around the vehicle can constantly visually recognize P61, which is a display element indicating the intention of the conveyance content, at all times.

As a result, the lighting control device 40 can execute a visible-light animation display that enables a person or a driver around the vehicle to quickly understand the conveyance content without a risk of the display of P61 being overlooked.

[Case 3] Visible-light animation combining special icons

The aim of Case 3 is to issue an even stronger alert by displaying a warning icon using a special icon onto the road surface when the vehicle performs some kind of movement.

Figure 7:
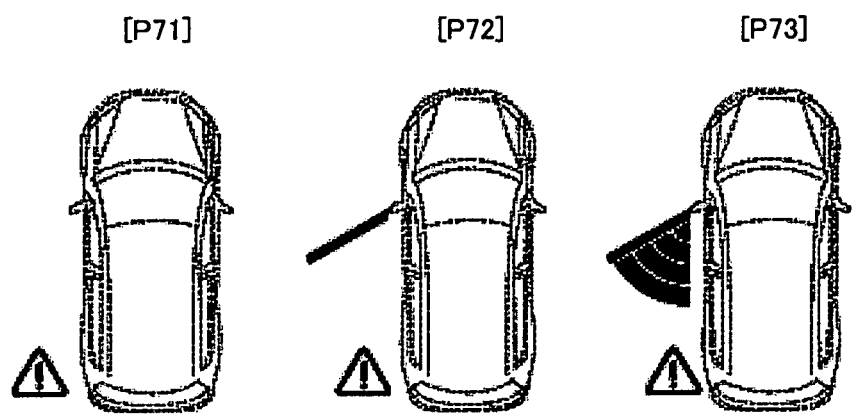
FIG. 7 is a diagram for illustrating an example of a visible-light animation used together with a warning icon associated with door opening of pushing out a door in the first embodiment of the present invention.

FIG. 7 is a diagram for illustrating an example of a visible-light animation used together with a warning icon associated with door opening of pushing out a door in the first embodiment of the present invention. In FIG. 7, there is illustrated a state in which a dynamic display is performed by sequentially switching among the following three types of displays of P71 to P73.

P71: Display a warning icon enabling the fact that some kind of action is to occur on the left side of the vehicle to be visualized P72: Display enabling a state in which the door is open to be visualized+display of a warning icon P73: Display corresponding to an entire area in which the door moves when moving from a state in which the door is closed to the state of P72+Display of warning icon The display of the warning icon of P71 in FIG. 7 corresponds to a display element indicating the intention of the conveyance content. The lighting control device 40 repeatedly blinks the displays of P71 to P73. At this time, the state of P71, which is a display element indicating the intention of the conveyance content, is also included in the displays of P72 and P73. Therefore, even when the displays of P71 to P73 are sequentially switched, a person or a driver around the vehicle can constantly visually recognize the display of the warning icon of P71, which is a display element indicating the intention of the conveyance content, at all times.

As a result, the lighting control device 40 can execute a visible-light animation display that enables a person or a driver around the vehicle to quickly understand the conveyance content without a risk of the display of the warning icon of P71 being overlooked.

In all of the visible-light animation displays illustrated in FIG. 3A to FIG. 7, a part of the design indicating the intention of the conveyance content is constantly displayed such that there is no time during which the entire graphic is hidden. As a result, it is possible to implement a visible-light animation display that enables a user to quickly understand the display content when the graphic issuing an alert is displayed without a risk of overlooking the graphic.

With such a visible-light animation, when the displays of a plurality of display patterns are switched, it is also possible to fade-in or fade-out a visible-light animation, or link a visible-light animation with another display device, for example, a turn signal lamp.

Next, specific examples of the irradiation patterns stored in the lighting DB in FIG. 2 are described. The lighting control device 40 illustrated in FIG. 2 discriminates the vehicle state based on various types of information acquired from the overall control ECU 10, and extracts an irradiation pattern in line with the vehicle state from the lighting DB, which enables an appropriate visible-light animation to be displayed. Therefore, there are now described in detail four factors as the adjustable elements of the irradiation pattern, namely, (1) timing, (2) brightness/color, (3) display position, and (4) size.

(1) Timing

The display timing may be adjusted in accordance with a pedestrian who receives information on the alert, or the driver of a two-wheeled vehicle or bicycle. As a specific example, the display timing may be changed in accordance with the following parameters.

Parameter 1: Distance to person who receives information
Parameter 2: Attribute of person who receives information Regarding Parameter 1, for example, when the display is to be performed such that a pedestrian can visually recognize the display from a position 10 m to 20 m away from the own vehicle, the lighting control device 40 may perform display control at the following timing, for an example.

Start display three seconds or more before the vehicle starts to move.
Stop display when the distance between the pedestrian and the own vehicle becomes three meters or less.

Regarding Parameter 2, for example, when the information is to be presented to the driver of a two-wheeled vehicle or a bicycle or to an elderly person, such a person tends to lean slightly forward more than in the case of a pedestrian, and hence such a person has a lower field of view. Therefore, it is desired for the lighting control device 40 to start the display at a slightly earlier timing in the case of such a person than in the case of a pedestrian who is standing upright.

As another example, when the person who receives the information is a child, the child may be distracted by the display. Therefore, in such a case, the lighting control device 40 may set the timing to stop the display comparatively earlier than for other people.

The data of the display timing corresponding to such Parameters 1 and 2 can be stored in advance in the lighting DB as a database. As a result, the lighting control device 40 can extract from the lighting DB an irradiation pattern in line with the vehicle state discriminated based on various types of information acquired from the overall control ECU 10, and can perform a visible-light animation display having an appropriate display timing.

(2) Brightness and Color

It is desired to maintain a specific contrast difference between the display surface and the non-display surface in view of the relationship with peripheral ambient light, the floor surface material, and other conditions. Generally, it is said that the brightness contrast difference of the light is to be maintained at a ratio of "display surface:non-display surface" of 4:1 or more.

However, there are various factors influencing the contrast, for example, the material of the floor surface, and hence it is desired, but not always required, that the brightness be adjusted in accordance with the peripheral environment at that time.

When the display color is to be changed in order to secure the brightness contrast difference, for example, when the color of the road surface is close to black, contrast adjustment may be performed by employing as the display color a color based on light blue and white, such as light blue, yellow green, green, or white, and when the color of the road surface is close to white, employing a color based on yellow and white as the display color, such as yellow, yellow green, green, or white.

The brightness and color corresponding to such a display surface can be stored in advance in the lighting DB as a database. As a result, the lighting control device 40 can extract from the lighting DB an irradiation pattern in line with the vehicle state discriminated based on various types of information acquired from the overall control ECU 10, and can perform a visible-light animation display having an appropriate brightness and color.

(3) Display Position

The display position may be adjusted in accordance with the person who receives the alert information. As a specific example, the display position may be changed in accordance with Parameters 1 and 2 described in the "(1) Timing" section.

Regarding Parameter 1, for example, when a pedestrian is at a position 20 m to 30 m away from the own vehicle, an advance notice alert may be displayed in an area away from the own vehicle. Meanwhile, when the pedestrian is at a position 10 m to 20 m away from the own vehicle, an advance notice alert may be displayed in an area close to the own vehicle.

Regarding Parameter 2, for example, when the information is to be presented to a drive of a two-wheeled vehicle or a bicycle or to an elderly person, such a person tends to lean slightly forward more than in the case of a non-handicapped pedestrian, and hence such a person has a lower field of view. Therefore, for people having such an attribute, it is desired for the lighting control device 40 to perform the display at a position closer to the driver of the two-wheeled vehicle or the bicycle or the elderly person.

As described above, in addition to shifting the display position in accordance with Parameter 2, for example, a special display, for example, the warning icon described with reference to FIG. 7, may also be added. When the person who receives the information is a child, the child may be distracted by the display. Therefore, in such a case, the lighting control device 40 may shift the display position or extinguish the display when the child approaches.

The data of the display position corresponding to such Parameters 1 and 2 can be stored in advance in the lighting DB as a database. As a result, the lighting control device 40 can extract from the lighting DB an irradiation pattern in line with the vehicle state discriminated based on various types of information acquired from the overall control ECU 10, and can perform a visible-light animation display at an appropriate display position.

(4) Size

The display size may be adjusted in accordance with the distance to the person who receives the alert information. As a specific example, for example, when a pedestrian is at a position 10 m to 20 m away from the own vehicle, the display size may be set to 1 m square or more, and when the pedestrian is at a position 10 m or less from the own vehicle, the display size may be set to be smaller.

The graphic to be displayed may be changed in accordance with the distance between the person who receives the information and the own vehicle. For example, when a pedestrian is at a position 10 m or more away from the own vehicle, the aspect ratio of the graphic may be stretched by a factor of 2 or more in the vertical direction.

In this way, the data of a display size corresponding to, for example, a distance to the person who receives the alert information can be stored in advance in the lighting DB as a database. As a result, the lighting control device 40 can extract from the lighting DB an irradiation pattern in line with the vehicle state discriminated based on various types of information acquired from the overall control ECU 10, and can perform a visible-light animation display by adjusting the display content to a size that is easier to understand.

Figure 8:
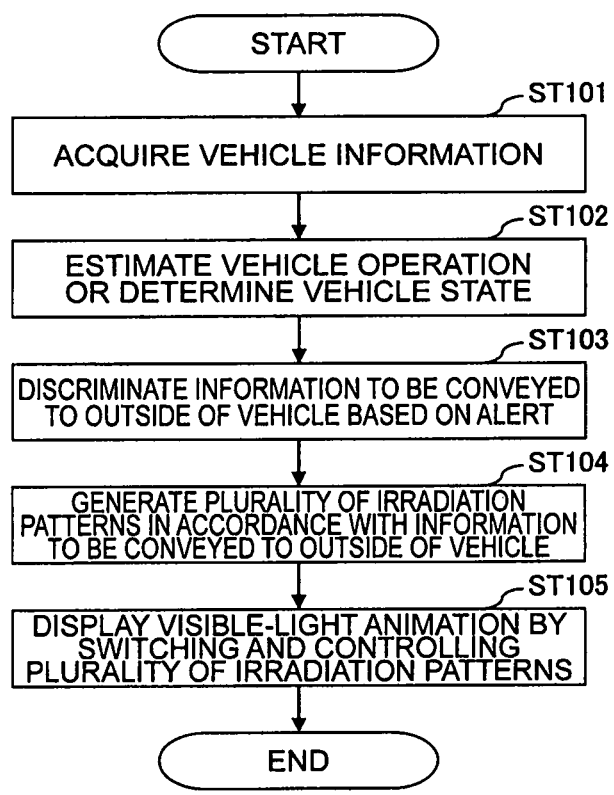
FIG. 8 is a flowchart for illustrating a series of operations by the lighting control device in the first embodiment of the present invention.

Next, a series of operations for implementing the visible-light animation display when issuing an alert from the automobile is described with reference to a flowchart. FIG. 8 is a flowchart for illustrating a series of operations by the lighting control device 40 in the first embodiment of the present invention. In the following description, there is described the association with each constituent component in the lighting control device 40 illustrated in FIG. 2.

First, in Step ST101, the vehicle information acquisition unit 41a acquires vehicle information from the vehicle. For example, the vehicle information acquisition unit 41a acquires vehicle information indicating that the position of the gearshift lever has moved from "P" to "D" and that a hand brake is turned "OFF". The vehicle information acquisition unit 41a may also acquire vehicle information indicating that the position of the gearshift lever has moved from "P" to "R" and that the hand brake is turned "OFF", for example.

Next, in Step ST102, the vehicle state discrimination unit 41b estimates a vehicle operation based on the vehicle information, and outputs the estimated vehicle operation as a discrimination result to the integrated discrimination unit 41c.

For example, when vehicle information indicating that the position of the gearshift lever has moved from "P" to "D" and the hand brake is turned "OFF" is obtained, the vehicle state discrimination unit 41b estimates that the own vehicle is about to move forward from a stationary state. For example, when vehicle information indicating that the position of the gearshift lever has moved from "P" to "R" and the hand brake is turned "OFF" is obtained, the vehicle state discrimination unit 41b may estimate that the vehicle is about to reverse from a stationary state.

In addition to estimation of the vehicle operation, the vehicle state discrimination unit 41b may also determine the state of the vehicle and output the determined state to the integrated discrimination unit 41c as a discrimination result. The vehicle state discrimination unit 41b may determine the state in which the door is unlocked, for example, by using the door opening and closing sensor.

Next, in Step ST103, the integrated discrimination unit 41c discriminates the information to be conveyed to the outside of the vehicle based on the discrimination result of the vehicle state discrimination unit 41b. For example, when a discrimination result indicating that "the own vehicle is about to move forward from a stationary state" is obtained, the integrated discrimination unit 41c may transmit to the lighting discrimination unit 43a a message that the information to be conveyed to the outside of the vehicle is irradiation of an alert that the vehicle is to move forward, as illustrated in FIG. 5A or FIG. 5B described above.

For example, when a discrimination result indicating that opening of a door is triggered, such as "a door has been unlocked" or "a person in the vehicle has placed his or her hand on the door handle", is obtained, the integrated discrimination unit 41c may transmit to the lighting discrimination unit 43a a message that the information to be conveyed to the outside of the vehicle is irradiation of an alert that a door is about to open, as illustrated in FIG. 3A to FIG. 3C described above.

Next, in Step ST104, when the information to be conveyed to the outside of the vehicle is received from the integrated discrimination unit 41c, the lighting discrimination unit 43a refers to the lighting DB 43b to discriminate lighting by a plurality of irradiation patterns suitable for information to be conveyed to the outside of the vehicle. Specifically, the lighting discrimination unit 43a generates a plurality of irradiation patterns suitable for information to be conveyed to the outside of the vehicle.

As a result, the lighting discrimination unit 43a can generate a plurality of irradiation patterns, such as those illustrated in FIG. 3A, FIG. 3B, FIG. 3C, FIG. 4A, FIG. 4B, FIG. 4C, FIG. 5A, FIG. 5B, FIG. 6, and FIG. 7.

Next, in Step ST105, the lighting instruction unit 43c controls each light device by transmitting an irradiation instruction to each light device in accordance with an instruction from the lighting discrimination unit 43a. Specifically, the lighting instruction unit 43c performs a visible-light animation display by switching and controlling the plurality of irradiation patterns generated by the lighting discrimination unit 43a.

The lighting instruction unit 43c may also instruct an in-vehicle speaker to output audio matching a visible-light animation when the visible-light animation is irradiated onto the road surface. At this time, the lighting instruction unit 43c may output the audio to, for example, the driver inside the vehicle, or may output the audio to a person outside the vehicle.

As described above, in the first embodiment, a visible-light animation can be provided to a pedestrian or the driver of a bicycle or a two-wheeled vehicle who is to receive the alert information, under a state in which the display element indicating the intention of the conveyance content is constantly displayed. As a result, pedestrians and drivers of bicycles or two-wheeled vehicles in the periphery of the vehicle can pay attention to the warning on the display and quickly take avoidance action.

Pedestrians, for example, can also understand that the area in which the alert is displayed is the road surface or the vehicle body. Pedestrians, for example, can also quickly understand, based on the visible-light animation, the content of the alert and the area to be alerted, without a risk of the alert content and area being overlooked.

The maximum range in which a door physically opens (e.g., refer to FIG. 3A and FIG. 3B) and the maximum area in which the vehicle is expected to move (e.g., refer to FIG. 4B and FIG. 4C) can also be constantly displayed as a display element indicating the intention of the conveyance content. As a result, a pedestrian or the driver of a bicycle or two-wheeled vehicle in the periphery of the vehicle can take an appropriate and quick avoidance action based on the constantly displayed content, which enables an unexpected situation to be prevented in advance.

Second Embodiment

In the first embodiment, there is described a visible-light animation display at a time when an alert is issued from the automobile. Meanwhile, in a second embodiment of the present invention, there is described a case of a visible-light animation display at a time when guidance of an appropriate movement path is issued to a user in a building, for example.

First, a hardware configuration is described.

Figure 9:
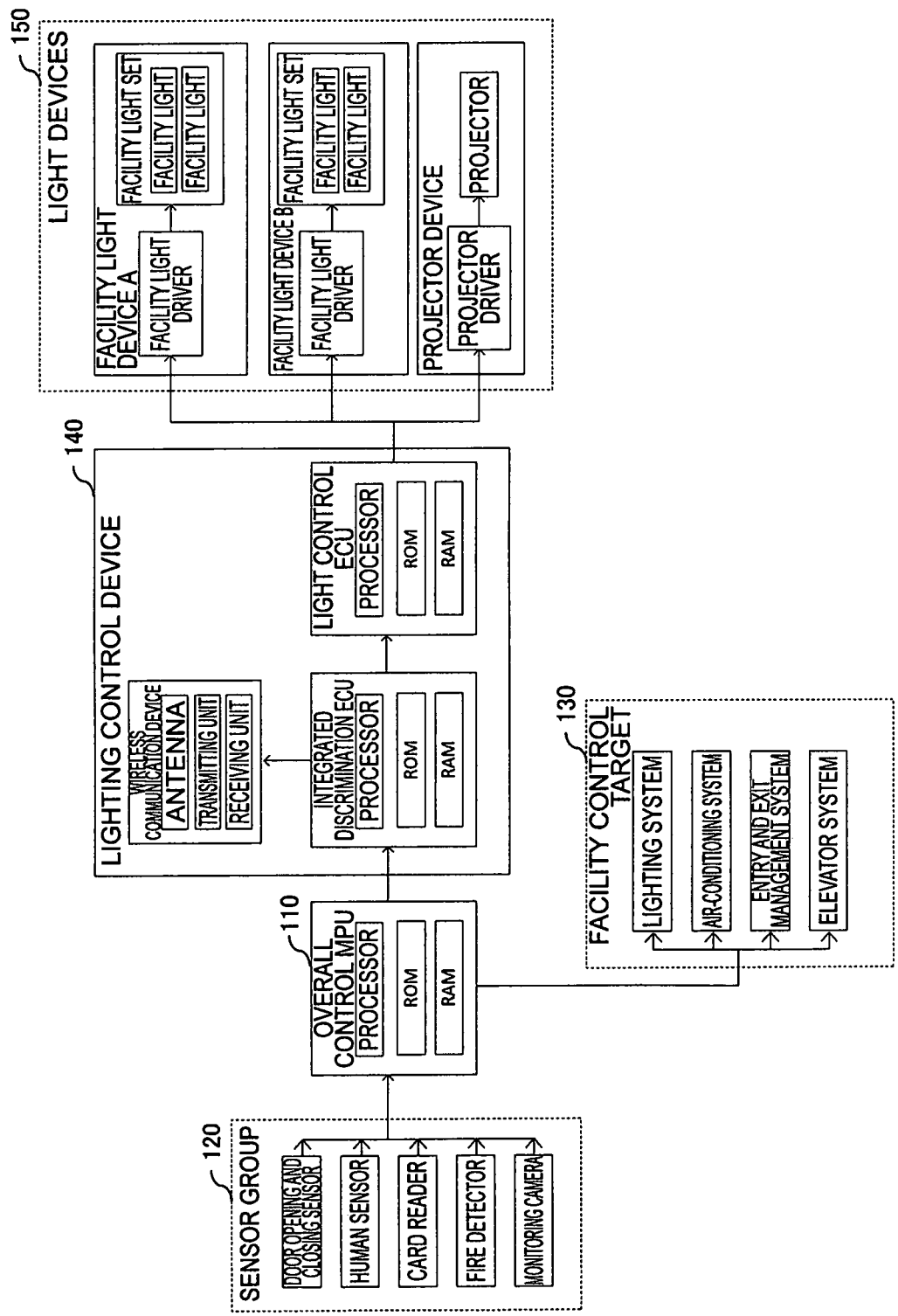
FIG. 9 is a block diagram for illustrating a configuration diagram of hardware in a second embodiment of the present invention.

FIG. 9 is a block diagram for illustrating a configuration diagram of hardware in the second embodiment of the present invention. As illustrated in FIG. 9, a facility in the second embodiment includes a sensor group 120 including various sensors, cameras, and the like. An overall control micro processing unit (MPU) 110 can control the hardware by transmitting various instructions to other hardware based on information obtained from the various sensors in the sensor group 120.

The overall control MPU 110 transmits predetermined information received from other hardware to an integrated discrimination MPU in a lighting control device 140 via a bus. The lighting control device 140 controls light devices 150 for the facility, such as an external light device A, an external light device B, and a projector device, based on the information received from the overall control MPU 110.

In FIG. 9, the sensor group 120 includes a door opening and closing sensor, a human sensor, a card reader, a fire detector, and a monitoring camera.

The overall control MPU 110 receives information detected by each sensor in the sensor group 120 and images photographed by the cameras.

The various sensors included in the sensor group 120 are now described.

The door opening and closing sensor detects opening and closing of a door of an elevator installed in the facility. The door opening and closing sensor outputs information on opening and closing of the door to the overall control MPU 110.

The human sensor detects the presence or absence of a person in a detection area. The human sensor outputs information on the presence or absence of a person to the overall control MPU 110.

The card reader is a sensor set at an entrance or exit of an area for which entry and exit are controlled. The card reader outputs ID information, entry and exit information, destination information, and the like stored on the card to the overall control MPU 110.

The fire detector detects the occurrence of fire in the installed region. The fire detector outputs the detection result as fire information to the overall control MPU 110.

The monitoring camera is a camera (image pickup device) arranged in order to photograph the inside of the installation area. The monitoring camera outputs each photographed image to the overall control MPU 110. The overall control MPU 110 can detect and recognize people and determine an attribute of those people based on each photographed image.

Next, the overall control MPU 110 is described.

The overall control MPU 110 is an MPU having a function of controlling the entire facility. The overall control MPU 110 acquires the detection information from the various sensors, and based on the acquired information, executes control of the entire facility by transmitting instructions and information to appropriately operate each unit of the facility.

The overall control MPU 110 includes a processor, a read-only memory (ROM), and a random-access memory (RAM). The processor is an arithmetic processing circuit configured to execute various arithmetic processing in the overall control MPU 110. The processor is hardware that, in addition to the processor, can also be referred to by various designations, such as an arithmetic processing circuit, an electric circuit, and a controller.

The processor is built from one or a collection of two or more arithmetic processing circuits. The processor can execute arithmetic processing by reading a program from the ROM and running the read program in the RAM.

The ROM is a nonvolatile storage device storing one or more programs. The RAM is a volatile storage device to be used as an area onto which programs and various types of information are to be loaded by the processor. The ROM and the RAM are built from, for example, a semiconductor storage device, and can also be referred to as "memory".

In the second embodiment, there is described an example in which the ROM is a storage device storing a program to be executed by the processor, but the storage device is not limited to this, and may be, for example, a nonvolatile mass storage device referred to as "storage", such as a hard disk drive (HDD) or a solid-state drive (SSD).

The storage devices including a storage may be collectively referred to as "memory". The configuration of such a memory is the same for the integrated discrimination MPU and the light control MPU, which are described later.

Next, each constituent component of a facility control target 130 in FIG. 9 is described.

A lighting system controls the lighting in the facility in an integrated manner. An air-conditioning system controls the air-conditioning in the facility in an integrated manner. An entry and exit management system manages entry into and exit from each designated region in the facility. An elevator system controls the operation of the elevator installed in the facility.

Next, each constituent component of the lighting control device 140 in FIG. 9 is described.

The lighting control device 140 is a control device having a function of controlling the light devices installed in the facility. The lighting control device 140 includes an integrated discrimination MPU, a wireless communication device, and a light control MPU.

The facility in the second embodiment has a function of conveying guidance, warnings, and the like to various places in the facility by irradiation of light from various light devices. In this case, the "light device" refers to the light devices 150, which is a collective term for a facility light device A, a facility light device B, and a projector device, which are described later.

The integrated discrimination MPU is a device having a function of discriminating the situation of the facility based on various types of information input from the overall control MPU 110, and determining the content to be conveyed to the surroundings by the light devices 150. Like the overall control MPU 110, the integrated discrimination MPU includes a processor, a ROM, and a RAM.

The integrated discrimination MPU receives various types of information from the overall control MPU 110, determines the state of the facility, and transmits information for controlling the irradiation of each light device to the light control MPU. The integrated discrimination ECU also transmits to the wireless communication device an instruction relating to communication.

The wireless communication device is a communication device configured to perform wireless communication to and from an external communication device. The wireless communication device uses a specific frequency band to perform communication to and from the control device of another facility, a higher-level control device, and a communicable electronic device carried by a person, for example, a smartphone.

This communication may be unique communication using a specifically determined frequency band, or may be communication using a standardized communication standard. This communication may also be communication using existing communication standards such as wireless local area network (LAN), Bluetooth (trademark), and Zigbee (trademark).

The wireless communication device transmits wireless signals from a transmitting unit to another device via an antenna, and receives wireless signals from another device from a receiving unit via the antenna.

The light control MPU is a control device configured to determine the light to be irradiated by each light device and transmit an instruction to the light devices 150. The light control MPU includes a processor, a ROM, and a RAM. The light control MPU determines an irradiation pattern of each light device based on information input from the integrated discrimination MPU, and transmits an irradiation instruction to each light device based on the determined irradiation pattern.

In this case, the "irradiation pattern" refers to a pattern formed from one display element or from a combination of two or more display elements. The irradiation pattern has adjustable elements, such as an irradiation shape, position, size, color, timing, brightness, and duration, which enables the visibility of the pattern to be changed in accordance with a peripheral environment under which the pattern is to be displayed.

Next, each constituent component of the light devices 150 in FIG. 9 is described.

The facility light device A is an irradiation device mounted so as to face a predetermined region within the facility. The facility light device A has a function of conveying information, such as a guidance and a warning, to users in the facility by irradiating light onto a floor surface or a wall surface. In order to convey such information to users in the facility, the facility light device A irradiates light onto the floor surface and the like in an irradiation pattern suitable for conveying the information.

The facility light device A has a facility light driver and a facility light set. The facility light driver is a driving device configured to drive the facility light set to cause the facility light set to irradiate predetermined light.

The facility light driver A has a function of controlling a combination of an irradiation timing, an irradiation time, and the like of each facility light in the facility light set. The facility light driver A can also operate a color filter, a shade, a light guiding mechanism, and the like arranged in the facility lights to irradiate light having the predetermined irradiation pattern onto a predetermined area.

A facility light set A includes a plurality of facility lights (irradiation devices). A plurality of facility lights are turned on based on control by the facility light driver.

The facility light device B is an irradiation device mounted so as to face a predetermined region within the facility. The facility light device B has a function of conveying information, such as a guidance and a warning, to users in the facility by irradiating light onto a floor surface or a wall surface. In order to convey such information to users in the facility, the facility light device B irradiates light onto the floor surface and the like in an irradiation pattern suitable for conveying the information.

The facility light device B has a facility light driver and a facility light set. The facility light driver is a driving device configured to drive the facility light set to cause the facility light set to irradiate predetermined light.

The facility light driver B has a function of controlling a combination of an irradiation timing, an irradiation time, and the like of each facility light in the facility light set. The facility light driver B can also operate a color filter, a shade, a light guiding mechanism, and the like arranged in the facility lights to irradiate light having the predetermined irradiation pattern onto a predetermined area.

A facility light set B includes a plurality of facility lights (irradiation devices). A plurality of facility lights are turned on based on control by the operation of the facility light driver.

The projector device is an image projection device mounted so as to face a predetermined region within the facility. The projector device has a function of conveying information, such as a guidance, a warning, and the like, to users in the facility by irradiating light onto a floor surface or a wall surface. In order to convey such information to users in the facility, the projector device irradiates (projects) light onto the floor surface and the like in an irradiation pattern suitable for conveying the information.

The projector device includes a projector driver and a projector. The projector driver is a driving device configured to drive the projector to cause the projector to irradiate predetermined light. The projector driver has a function of controlling the irradiation pattern of the light irradiated by the projector.

The projector is an irradiation (projection) device configured to irradiate (project) light (image) in the facility. The projector irradiates light (image) in the facility (onto the floor surface or the wall surface) based on the operation of the projector driver.

Next, details of the specific control processing by the lighting control device 140 are described.

Figure 10:
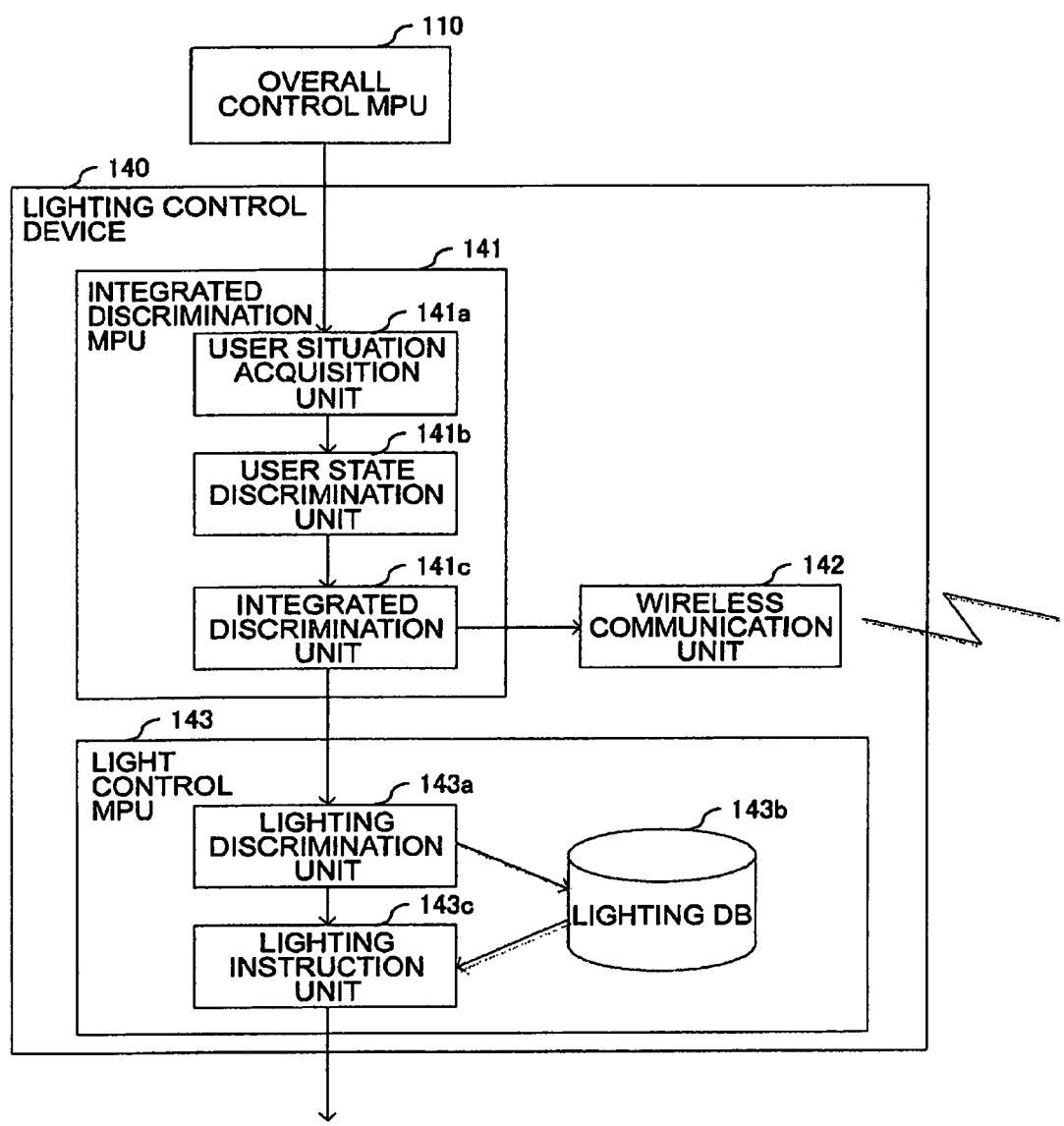
FIG. 10 is a block diagram for illustrating a functional configuration of a lighting control device in the second embodiment of the present invention.

FIG. 10 is a block diagram for illustrating a functional configuration of the lighting control device 140 in the second embodiment of the present invention. The lighting control device 140 in the second embodiment includes an integrated discrimination MPU 141, a wireless communication unit 142, and a light control MPU 143.

The integrated discrimination MPU 141 in the lighting control device 140 includes a user situation acquisition unit 141*a*, a user state discrimination unit 141*b*, and an integrated discrimination unit 141*c*. The light control MPU 143 in the lighting control device 140 includes a lighting discrimination unit 143*a*, a lighting DB 143*b*, and a lighting instruction unit 143*c*.

The user situation acquisition unit 141*a* has a function of acquiring various types of information from the overall control MPU 110. The information acquired by the user situation acquisition unit 141*a* corresponds to information on the movement of people in the facility, which is obtained from, for example, information such as the detection information from the door opening and closing sensor, the human sensor, the fire detector, and the like mounted to indoor and outdoor facilities, and recognition information based on cameras mounted in the paths of the facility. The user situation acquisition unit 141*a* transmits the acquired information to the user state discrimination unit 141*b*.

The user state discrimination unit 141*b* has a function of discriminating the display content based on the information on the movement of people in the facility received from the user situation acquisition unit 141*a*. For example, the user situation acquisition unit 141*a* can discriminate the presence or absence of moving people and an attribute of those people from the door opening and closing sensors attached to the doors and entrances between rooms, door opening and closing sensors attached to elevator doors, detection information from card readers, and the like.

The user situation acquisition unit 141*a* can also discriminate the presence or absence of a person in a display or projection area and an attribute of that person, or the presence or absence of a person within a range in which a display or projection area can be visibly recognized and an attribute of that person, based on the detection information from the human sensors or cameras installed in an equipment area displaying or projecting the guidance.

The integrated discrimination unit 141c has a function of discriminating the information to be conveyed to the users in the facility based on the discrimination result of the user state discrimination unit 141b. For example, the integrated discrimination unit 141c transmits to the lighting discrimination unit 143a, as information to be conveyed to the facility users, an instruction to perform irradiation for identifying and displaying the destination facility and the direction of that location in places where the paths in the facility branch off.

When the fire detector is operating, the integrated discrimination unit 141c transmits to the lighting discrimination unit 143a, as information to be conveyed to the facility users, an instruction to perform irradiation for evacuation guidance by presenting an evacuation path to the facility users.

The integrated discrimination unit 141c also has a function of controlling wireless communication based on the discrimination result of the user state discrimination unit 141b. The wireless communication unit 142 executes wireless communication to and from an external device in accordance with an instruction from the integrated discrimination unit 141c.

When the lighting discrimination unit 143a in the light control MPU 143 receives the information to be conveyed to the facility users from the integrated discrimination unit 141c, the lighting discrimination unit 143a refers to the lighting DB 143b and discriminates a suitable lighting irradiation pattern for the information to be conveyed to the facility users.

The functions of the light control MPU 143 illustrated in FIG. 10 in the second embodiment are the same as the functions of the light control MPU 143 illustrated in FIG. 2 in the first embodiment, but the data stored in the lighting DB 143b is different. Therefore, a description of each component is omitted, and a specific example of the irradiation patterns stored in the lighting DB 143b is described later. First, there is described with reference to the drawings a specific case of visible-light animations that are projected and displayed in order to perform guidance of an appropriate movement path to a user in a building or the like.

In the second embodiment, there are described specific examples of visible-light animations corresponding to the following three cases.

[Case 1] Visible-light animation combining display of destination facility, which is guidance target, and graphic indicating direction

[Case 2] Visible-light animation combining display of destination facility, which is guidance target, and graphic indicating direction, in which graphic indicating direction is different from that of Case 1

[Case 3] Visible-light animation displaying content of destination facility as well as location of destination facility, and combining graphics indicating direction between both displays The aim of each of Case 1 to Case 3 is to display a graphic indicating the destination facility of the guidance target and a graphic indicating the direction as a set, and to apply a visible-light animation relating to the graphic indicating the direction in order to promptly perform guidance in a building.

Figure 11:
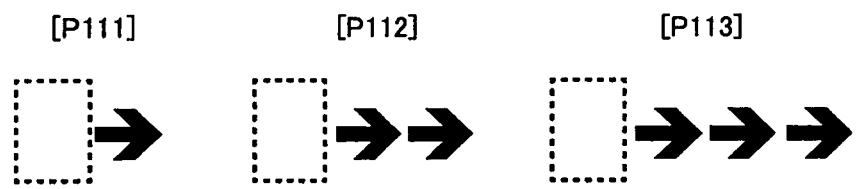
FIG. 11 is a diagram for illustrating an example of a first visible-light animation combining a display of a destination facility and a graphic indicating a direction in the second embodiment of the present invention.

[Case 1] Visible-light animation combining display of destination facility, which is guidance target, and graphic indicating direction FIG. 11 is a diagram for illustrating an example of a first visible-light animation combining the display of the destination facility and a graphic indicating the direction in the second embodiment of the present invention. In FIG. 11, there is illustrated a state in which a dynamic display is performed by sequentially switching among the following three types of displays of P111 to P113.

P111: Display enabling name of destination facility and direction of location to be visualized P112: Display in which the number of arrows is increased to two in order to further emphasize the direction P113: Display in which the number of arrows is increased to three in order to still further emphasize the direction The display of P111 in FIG. 11 corresponds to a display element indicating the intention of the conveyance content. The lighting control device 140 repeatedly blinks the displays of P111 to P113. At this time, the state of P111, which is a display element indicating the intention of the conveyance content, is also included in the displays of P112 and P113. Therefore, even when the displays of P111 to P113 are sequentially switched, the facility user can constantly visually recognize P111, which is a display element indicating the intention of the conveyance content, at all times.

As a result, the lighting control device 140 can execute a visible-light animation display that enables the facility user to quickly understand the conveyance content without a risk of the display of P111 being overlooked.

[Case 2] Visible-light animation combining display of destination facility, which is guidance target, and graphic indicating direction, in which graphic indicating direction is different from that of Case 1

Figure 12:
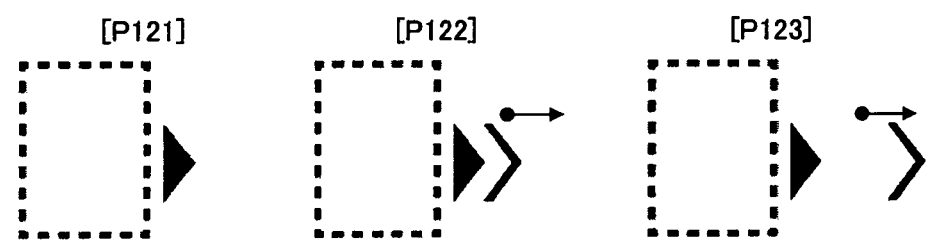
FIG. 12 is a diagram for illustrating an example of a second visible-light animation combining a display of a destination facility and a graphic indicating a direction in the second embodiment of the present invention.

FIG. 12 is a diagram for illustrating an example of a second visible-light animation combining the display of the destination facility and a graphic indicating the direction in the second embodiment of the present invention. In FIG. 12, there is illustrated a state in which a dynamic display is performed by sequentially switching among the following three types of displays of P121 to P123.

P121: Display enabling name of destination facility and direction of location to be visualized P122 and P123: Display of sliding animation in addition to display of P121 in order to further emphasize direction In the first visible-light animation illustrated in FIG. 11, a dynamic display is performed by changing the number of arrows that are displayed. In contrast, in the second visible-light animation illustrated in FIG. 12, a dynamic display is performed by sliding a graphic meaning the movement direction.

The display of P121 in FIG. 12 corresponds to a display element indicating the intention of the conveyance content. The lighting control device 140 repeatedly blinks the displays of P121 to P123. At this time, the state of P121, which is a display element indicating the intention of the conveyance content, is also included in the displays of P122 and P123. Therefore, even when the displays of P121 to P123 are sequentially switched, the facility user can constantly visually recognize P121, which is a display element indicating the intention of the conveyance content, at all times.

As a result, the lighting control device 140 can execute a visible-light animation display that enables the facility user to quickly understand the conveyance content without a risk of the display of P121 being overlooked.

Figure 13:
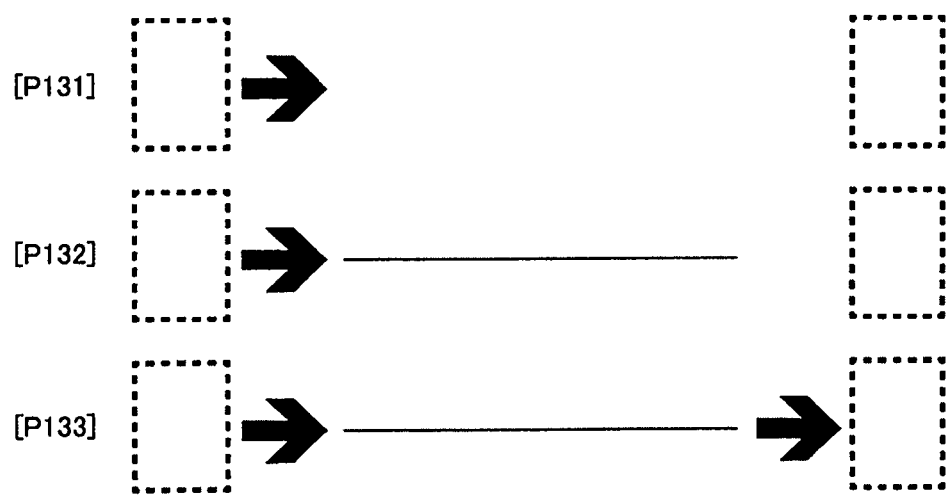
FIG. 13 is a diagram for illustrating an example of a third visible-light animation combining a display of a destination facility and a graphic indicating a direction in the second embodiment of the present invention.

[Case 3] Visible-light animation displaying content of destination facility as well as location of destination facility, and combining graphics indicating direction between both displays FIG. 13 is a diagram for illustrating an example of a third visible-light animation combining the display of the destination facility and a graphic indicating the direction in the second embodiment of the present invention. In FIG. 13, there is illustrated a state in which a dynamic display is performed by sequentially switching among the following three types of displays of P131 to P133.

P131: Displays enabling identification of the destination facility are displayed on the left side and the right side, and a graphic indicating the direction is displayed in combination therewith on the left side between the left and right displays P132: Display in which information complementing the destination facility and the direction is displayed in the middle In FIG. 13, although the complementary information is simply represented by a line segment, the complementary information may also be displayed as information supplementing appropriate characters, graphics, and the like.

P133: Display in which a graphic indicating the direction is added on the right side between the left and right displays in order to further emphasize the direction In the first visible-light animation illustrated in FIG. 11, a dynamic display is performed by changing the number of arrows that are displayed. In the second visible-light animation illustrated in FIG. 12, a dynamic display is performed by sliding a graphic meaning the movement direction. In contrast, in the third visible-light animation illustrated in FIG. 13, a dynamic display is performed by displaying complementary information and changing the number of arrows that are displayed.

The display of P131 in FIG. 13 corresponds to a display element indicating the intention of the conveyance content. The lighting control device 140 repeatedly blinks the displays of P131 to P133. At this time, the state of P131, which is a display element indicating the intention of the conveyance content, is also included in the displays of P132 and P133. Therefore, even when the displays of P131 to P133 are sequentially switched, the facility user can constantly visually recognize P131, which is a display element indicating the intention of the conveyance content, at all times.

As a result, the lighting control device 140 can execute a visible-light animation display that enables the facility user to quickly understand the conveyance content without a risk of the display of P131 being overlooked.

In all of the visible-light animation displays illustrated in FIG. 11 to FIG. 13, a display enabling identification of the destination facility and a display indicating the direction are constantly displayed such that there is no time during which those displays are not displayed. As a result, when information urging the movement direction toward the destination facility is displayed, a visible-light animation display that enables a user to quickly understand the display content without a risk of the information urging the movement direction being overlooked can be implemented.

Next, specific examples of the irradiation patterns stored in the lighting DB in FIG. 10 are described. The lighting control device 140 illustrated in FIG. 10 discriminates a peripheral environmental state based on various types of information acquired from the overall control MPU 110, and extracts an irradiation pattern in line with the peripheral environmental state from the lighting DB, which enables an appropriate visible-light animation to be displayed. Therefore, there are now described in detail four factors as the adjustable elements of the irradiation pattern, namely, (1) timing, (2) brightness/color, (3) display position, and (4) size.

(1) Timing

The display timing may be adjusted in accordance with a situation of a facility user who receives the information on guidance of a movement path. As a specific example, the timing to start, suspend, and end display of a visible-light animation may be controlled.

Specific examples of each condition for controlling the timing to start, suspend, and end the visible-light animation display are shown below.

Start condition: Start display and projection of the visible-light animation when there is a user within the range in which the display or projection area can be seen, or start display and projection of the visible-light animation when there is a user passing through a specific door or card reader.

Suspension condition: Suspend display and projection of the visible-light animation when the number of people in the area in which the guidance is to be displayed or projected exceeds a permitted number, because the guidance may not be able to be seen due to a plurality of people getting in the way.

End condition: End display and projection when there are no people within the range in which the display or projection area can be seen.

The data corresponding to each of the start, suspension, and end conditions can be stored in advance in the lighting DB as a database. As a result, the lighting control device 140 can extract from the lighting DB an irradiation pattern in line with the peripheral environmental state discriminated based on various types of information acquired from the overall control MPU 110, and can perform a visible-light animation display having an appropriate display timing.

(2) Brightness and Color

It is desired to maintain a specific contrast difference between the display surface and the non-display surface in view of the relationship with peripheral ambient light, the floor surface material, and the like. Generally, it is said that the brightness contrast difference of the light is to be maintained at a ratio of "display surface:non-display surface" of 4:1 or more.

However, there are various factors influencing the contrast, for example, the material of the floor surface, and hence it is desired, but not always required, that the brightness be adjusted in accordance with the peripheral environment state at that time.

When the display color is to be changed in order to secure the brightness contrast difference, for example, when the color of the floor surface or the wall surface is close to black, contrast adjustment may be performed by employing as the display color a color based on light blue and white, such as light blue, yellow green, green, or white, and when the color of the floor surface or the wall surface is close to white, employing a color based on yellow and white as the display color, such as yellow, yellow green, green, or white.

The brightness and color corresponding to such information on a display surface can be stored in advance in the lighting DB as a database. As a result, the lighting control device 140 can extract from the lighting DB an irradiation pattern in line with the peripheral environmental state discriminated based on various types of information acquired from the overall control MPU 110, and can perform a visible-light animation display having an appropriate brightness and color.

(3) Display Position

The display position may be adjusted in accordance with the situation of a person who receives the information on guidance of a movement path. As a specific example, the display position may be changed in accordance with the following parameters.

Parameter 1: Presence or absence of a person within the range in which the display or projection area can be seen Parameter 2: Presence or absence of a person in the area of the floor surface or the wall surface on which guidance is to be displayed or projected Parameter 3: Attribute of a facility user who requires guidance of the movement path Regarding Parameter 1, for example, the display position may be varied in accordance with the distance to a person within the range in which the display or projection area can be seen. Specifically, for example, the display position may be set differently in a case in which the person is at a distance of less than 5 m from a case in which the person is at a distance of 5 m or more away, or supplementary information may be provided by displaying an additional graphic in accordance with the distance.

Regarding Parameter 2, for example, when there are a plurality of people in the display or projection area of the guidance, the display position of the graphic may be shifted to reduce the ratio of the area hidden by people.

Regarding Parameter 3, when a person recognized for Parameters 1 and 2 has an attribute of a lower eye gaze, for example, in the case of a wheelchair user or an elderly person, the visible range of the floor surface is narrow. Therefore, for example, the display position may be shifted closer to the wheelchair user or the elderly person, or the information may be supplemented by displaying an additional graphic.

The data of the display position corresponding to such Parameters 1 to 3 can be stored in advance in the lighting DB as a database. As a result, the lighting control device 140 can extract from the lighting DB an irradiation pattern in line with the peripheral environmental state discriminated based on various types of information acquired from the overall control MPU 110, and can perform a visible-light animation display at an appropriate display position.

(4) Size

The display size may be adjusted in accordance with information on movement by a person who receives information on guidance of the movement path. As a specific example, the display size may be adjusted in accordance with Parameters 1 to 3 described in the "(3) Display Position" section.

Regarding Parameter 1, for example, the display size may be varied in accordance with the distance to a person within the range in which the display or projection area can be seen. Specifically, for example, the size of one graphic may be set to about 50 cm when the person is at a distance of less than 5 m, and the size of the graphic may be increased to about 100 cm when the person is at a distance of 5 m or more away.

Regarding Parameter 2, for example, when there are a plurality of people in the display or projection area of the guidance, the ratio of the area in the display graphic hidden by people may be reduced by increasing the size of the graphic itself.

Regarding Parameter 3, when a person recognized for Parameters 1 and 2 has an attribute of a lower eye gaze, for example, in the case of a wheelchair user or an elderly person, the visible range of the floor surface is narrow. Therefore, the size of the graphic may be set to be large.

When guidance is performed by a projection method, the size is adjusted such that the display does not touch other items (such as walls and equipment) in the facility. When it is required to improve the display brightness in accordance with the peripheral brightness, the display size may be reduced to improve the brightness.

In this way, the data of the display size corresponding to the situation of the person who receives the information on guidance of the movement path can be stored in advance in the lighting DB as a database. As a result, the lighting control device 140 can extract from the lighting DB an irradiation pattern in line with the peripheral environmental state discriminated based on various types of information acquired from the overall control MPU 110, and can perform a visible-light animation display by adjusting the display content to a size that is easier to understand.

Figure 14:
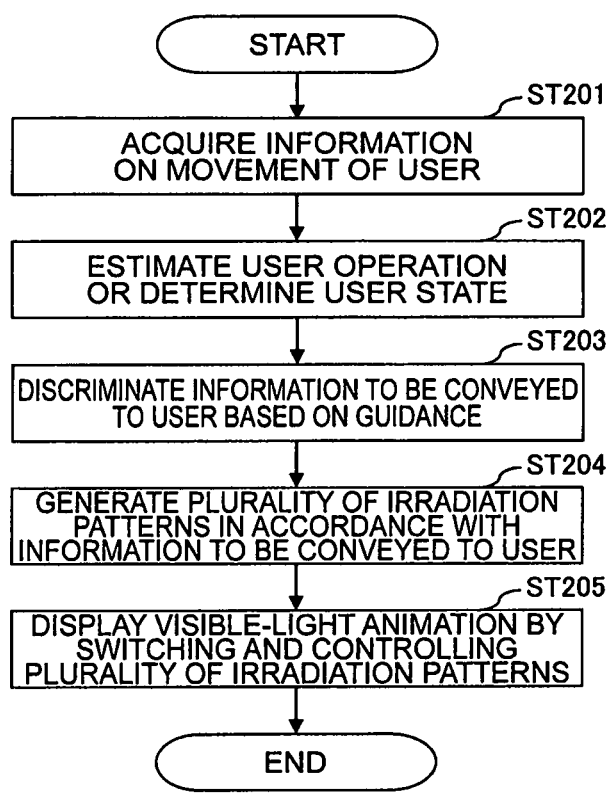
FIG. 14 is a flowchart for illustrating a series of operations by the lighting control device in the second embodiment of the present invention.

Next, a series of operations for implementing the visible-light animation display when issuing guidance of an appropriate movement path to a facility user is described with reference to a flowchart. FIG. 14 is a flowchart for illustrating a series of operations by the lighting control device 140 in the second embodiment of the present invention. In the following description, there is described the association with each constituent component in the lighting control device 140 illustrated in FIG. 10.

First, in Step ST201, the user situation acquisition unit 141a acquires various types of information on the movement of people in the facility from the facility side. The user situation acquisition unit 141a acquires, for example, detection information from door opening and closing sensors, or detection information from human sensors.

Next, in Step ST202, the user state discrimination unit 141b estimates a user operation based on the information acquired by the user situation acquisition unit 141a, and outputs the estimated user operation to the integrated discrimination unit 141c as a discrimination result.

For example, when information indicating that a door of an entrance leading to a movie theater in the facility is open has been obtained, the user state discrimination unit 141b estimates that the user is going to the movie theater.

In addition to estimation of a user operation, the user state discrimination unit 141b may determine a state of the user and output the determined state as the discrimination result to the integrated discrimination unit 141c. For example, the user state discrimination unit 141b may determine a state in which the user is proceeding along one of the paths of a branched path by using a human sensor installed in the branch area in the facility.

Next, in Step ST203, the integrated discrimination unit 141c discriminates, based on the discrimination result of the user state discrimination unit 141b, the information to be conveyed to the user. For example, when a discrimination result that "the user is going to the movie theater" is obtained, the integrated discrimination unit 141c may transmit to the lighting discrimination unit 143a a message that the information to be conveyed to the user is to perform irradiation for guidance to the movie theater, which is the destination facility, like those illustrated in FIG. 11 to FIG. 13.

When a discrimination result of a "state in which the user is at a branched path" is obtained, the integrated discrimination unit 141c may transmit to the lighting discrimination unit 143a a message that the information to be conveyed to the user is to perform irradiation for identifying and displaying each destination facility corresponding to the branched path and the location direction thereof.

Next, in Step ST204, when the information to be conveyed to the user is received from the integrated discrimination unit 141c, the lighting discrimination unit 143a refers to the lighting DB 143b, and discriminates lighting by a plurality of irradiation patterns suitable for information to be conveyed to the user. Specifically, the lighting discrimination unit 143a generates a plurality of irradiation patterns suitable for information to be conveyed to the user.

As a result, the lighting discrimination unit 143a can generate a plurality of irradiation patterns, such as those illustrated as examples in FIG. 11, FIG. 12, and FIG. 13.

Next, in Step ST205, the lighting instruction unit 143c controls each light device by transmitting an irradiation instruction to each light device in accordance with an instruction from the lighting discrimination unit 143a. Specifically, the lighting instruction unit 143c performs a visible-light animation display by switching and controlling the plurality of irradiation patterns generated by the lighting discrimination unit 143a.

The lighting instruction unit 143c may also instruct a speaker in the facility to output audio matching the visible-light animation to be irradiated on the floor surface or the wall surface.

As described above, in the second embodiment, a visible-light animation can be provided to a facility user who is to receive information on guidance of a movement path, under a state in which the display element indicating the intention of the conveyance content is constantly displayed. As a result, the facility user can quickly move to the destination facility in accordance with the display content.

In the second embodiment, a visible-light animation display for guiding a facility user to the location of a destination facility is described in detail. However, a visible-light animation display may be applied even in applications such as guidance of an evacuation path at a time when a disaster has occurred in the facility.

Third Embodiment

In the second embodiment, there is described a visible-light animation in which a part of a graphic indicating a direction is constantly displayed at a fixed position, like P111 in FIG. 11, P121 in FIG. 12, and P131 in FIG. 13, when guidance of an appropriate movement path is issued to, for example, a user in a building. However, in a third embodiment of the present invention, there is described a visible-light animation in which a graphic indicating a direction is constantly displayed while the graphic is being moved.

The hardware configuration is the same as that in FIG. 9 in the second embodiment, and the functional configuration of the lighting control device 140 is the same as in FIG. 10 in the second embodiment, and hence a description thereof is omitted here. Therefore, in the following, there is described in detail with reference to the drawings a visible-light animation in the third embodiment, which is projected or displayed while a graphic indicating a direction is being moved, in order to issue guidance of an appropriate movement path to, for example, the user in a building.

In the third embodiment, there are described specific examples of visible-light animations corresponding to the following three cases.

[Case 1] First visible-light animation combining display of destination facility, which is guidance target, and sliding graphic indicating direction

[Case 2] Second visible-light animation combining display of destination facility, which is guidance target, and sliding graphic indicating direction

[Case 3] Third visible-light animation combining display of destination facility, which is guidance target, and sliding graphic indicating direction In Case 1 and Case 2, there is a difference regarding whether the direction of the sliding animation indicating the direction is displayed so as to move away from the display of the destination facility or displayed so as to move toward the display of the destination facility. Case 3 is different from Cases 1 and 2 in that movement in two directions, namely, moving forward and then moving left, is displayed as the sliding animation, whereas the movement in one direction is displayed as the sliding animation in Cases 1 and 2.

The aim of each of Case 1 to Case 3 is to display a graphic indicating the destination facility of the guidance target and a sliding graphic indicating the direction as a set, and to apply a visible-light animation relating to the sliding graphic indicating the direction in order to promptly perform guidance in a building.

Figure 15:
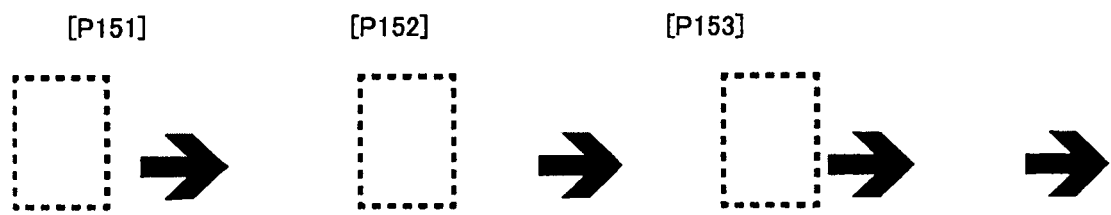
FIG. 15 is a diagram for illustrating an example of a first visible-light animation combining a display of a destination facility and a sliding graphic indicating a direction in a third embodiment of the present invention.

[Case 1] First visible-light animation combining display of destination facility as guidance target and sliding graphic indicating direction FIG. 15 is a diagram for illustrating an example of a first visible-light animation combining a display of the destination facility and a sliding graphic indicating a direction in the third embodiment of the present invention. In FIG. 15, there is illustrated a state in which a dynamic display is performed in such a manner that an arrow slides to the right. The following three types of displays of P151 to P153 are representative examples of the progress of the arrow sliding to the right. As a result, a sliding animation can be implemented under a state in which one or more arrows are constantly displayed.

P151: Display enabling name of destination facility and direction of location to be visualized, which corresponds to starting state of sliding operation P152: Display indicating current progress by sliding and displaying arrow in right direction, which is movement direction, from state of P151, in order to further emphasize direction P153: Display indicating a state in which an arrow at the left end is again displayed and a sliding operation is started when a slid arrow reaches the right end In each of the three types of displays of P151, P152, and P153 in FIG. 15, the destination facility has the same name and is displayed at a fixed position. The sliding graphic is not located at a fixed position, but the sliding graphic is always displayed as a graphic indicating the direction. In other words, the three types of displays of P151, P152, and P153 in FIG. 15 are not a single common display, but the combination of the name and the methodology of the destination facility is constantly displayed as a display element indicating the intention of the conveyance content.

The lighting control device 140 repeatedly blinks the displays of P151 to P153. At this time, the display element indicating the intention of the conveyance content is included in all of the displays of P151 to P153. Therefore, even when the displays of P151 to P153 are sequentially switched, a facility user can constantly visually recognize the display element indicating the intention of the conveyance content at all times.

As a result, the lighting control device 140 can execute a visible-light animation display that enables a facility user to quickly understand the conveyance content without a risk of the display element indicating the intention of the conveyance content being overlooked.

Figure 16:
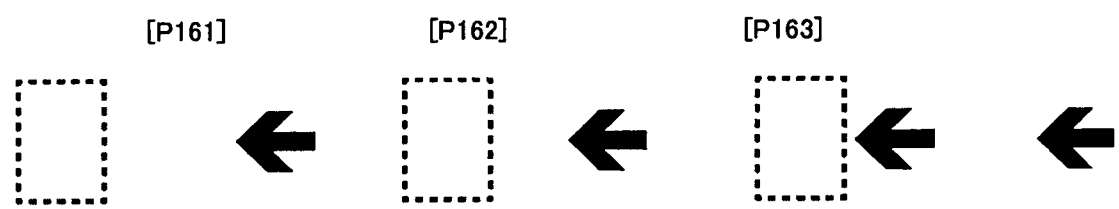
FIG. 16 is a diagram for illustrating an example of a second visible-light animation combining a display of a destination facility and a sliding graphic indicating a direction in the third embodiment of the present invention.

[Case 2] Second visible-light animation combining display of destination facility as guidance target and sliding graphic indicating direction FIG. 16 is a diagram for illustrating an example of a second visible-light animation combining a display of the destination facility and a sliding graphic indicating a direction in the third embodiment of the present invention. In FIG. 16, there is illustrated a state in which a dynamic display is performed in such a manner that an arrow slides to the left. The following three types of displays of P161 to P163 are representative examples of the progress of the arrow sliding to the left. As a result, a sliding animation can be implemented under a state in which one or more arrows are constantly displayed.

P161: Display enabling name of destination facility and direction of location to be visualized, which corresponds to starting state of sliding operation P162: Display indicating current progress by sliding and displaying arrow in left direction, which is movement direction, from state of P161, in order to further emphasize direction P163: Display indicating state in which an arrow at the right end is again displayed and a sliding operation is started when a slid arrow reaches the left end In each of the three types of displays of P161, P162, and P163 in FIG. 16, the destination facility has the same name and is displayed at a fixed position. The sliding graphic is not located at a fixed position, but the sliding graphic is always displayed as a graphic indicating the direction. In other words, the three types of displays of P161, P162, and P163 in FIG. 16 are not a single common display, but the combination of the name and the methodology of the destination facility is constantly displayed as a display element indicating the intention of the conveyance content.

The lighting control device 140 repeatedly blinks displays of the P161 to P163. At this time, the display element indicating the intention of the conveyance content is included in all of the displays of P161 to P163. Therefore, even when the displays of P161 to P163 are sequentially switched, a facility user can constantly visually recognize the display element indicating the intention of the conveyance content at all times.

As a result, the lighting control device 140 can execute a visible-light animation display that enables a facility user to quickly understand the conveyance content without a risk of the display element indicating the intention of the conveyance content being overlooked.

Figure 17:
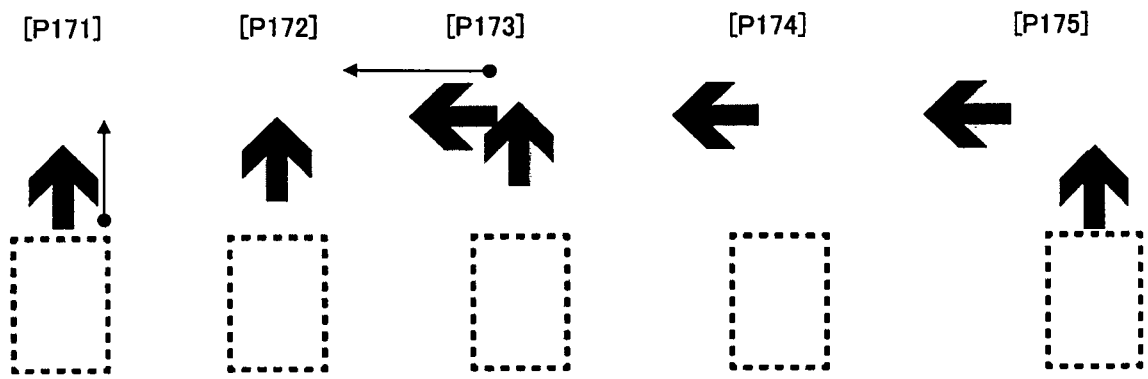
FIG. 17 is a diagram for illustrating an example of a third visible-light animation combining a display of a destination facility and a sliding graphic indicating a direction in the third embodiment of the present invention.

[Case 3] Third visible-light animation combining display of destination facility as guidance target and sliding graphic indicating direction FIG. 17 is a diagram for illustrating an example of a third visible-light animation combining a display of the destination facility and a sliding graphic indicating a direction in the third embodiment of the present invention. In FIG. 17, there is illustrated a state in which a dynamic display is performed in such a manner that the arrow slides to the left after moving upward (in a straight direction). The following five kinds of displays of P171 to P175 are representative example of progress of an arrow sliding in two directions. As a result, a sliding animation can be implemented under a state in which one or more arrows are constantly displayed.

P171: Display enabling name of destination facility and initial movement direction at present time to be visualized, which corresponds to starting state of sliding operation P172: Display indicating current progress by sliding and displaying arrow in straight direction, which is movement direction, from state of P171, in order to further emphasize direction P173: Display indicating a state in which a sliding operation in the left direction is to start when the slid arrow reaches the upper end and then the left direction arrow indicating left turn is displayed P174: Display indicating current progress by sliding and displaying arrow in left direction, which is movement direction, from state of P173, in order to further emphasize direction in left direction after movement straight ahead P175: Display indicating a state in which the arrow of P171 is again displayed and a sliding operation is started when the slid arrow reaches the left end In each of the five types of displays of P171, P172, P173, P174, and P175 in FIG. 17, the destination facility has the same name and is displayed at a fixed position. The sliding graphic is not located at a fixed position, but the sliding graphic is always displayed as a graphic indicating the direction. In other words, the five types of displays of P171, P172, P173, P174, and P175 in FIG. 17 are not a single common display, but the combination of the name and the methodology of the destination facility is constantly displayed as a display element indicating the intention of the conveyance content. A facility user who has seen FIG. 17 can obtain information on two directions, that is, to go straight ahead and then turn left.

The lighting control device 140 repeatedly blinks the displays of P171 to P175. At this time, the display element indicating the intention of the conveyance content is included in all of the displays of P171 to P175. Therefore, even when the displays of P171 to P175 are sequentially switched, a facility user can constantly visually recognize the display element indicating the intention of the conveyance content at all times.

Through repeated display of a loop-display of an arrow graphic indicating the movement direction so that one or more arrow graphics are constantly displayed, it is possible to accurately convey a movement path including a plurality of directions.

As a result, the lighting control device 140 can execute a visible-light animation display that enables a facility user to quickly understand the conveyance content without a risk of the display element indicating the intention of the conveyance content being overlooked.

In all of the visible-light animation displays illustrated in FIG. 15 to FIG. 17, a display enabling identification of the destination facility and a display indicating the direction are constantly displayed such that there is no time during which those displays are not displayed. As a result, when information urging the movement direction toward the destination facility is displayed, a visible-light animation display that enables a user to quickly understand the display content without a risk of the information urging the movement direction being overlooked can be implemented.

The flowchart of the series of operations by the lighting control device 140 in the third embodiment is the substantially the same as the flowchart of FIG. 14 described in the second embodiment, and hence a description thereof is omitted here.

As described above, in the third embodiment, a visible-light animation can be provided to a facility user who is to receive information on guidance of a movement path, under a state in which the display element indicating the intention of the conveyance content is constantly displayed. As a result, the facility user quickly moves to the destination facility in accordance with the display content.

In particular, in the third embodiment, the visible-light animation can be displayed in such a way that the facility user can quickly understand a movement path combining a plurality of directions by constantly displaying a graphic indicating the direction while moving the graphic.

REFERENCE SIGNS LIST

40 lighting control device (irradiation control device), 41 integrated discrimination ECU (acquisition unit), 43 light control ECU, 43a lighting discrimination unit (discrimination unit), 43b lighting DB (database), 43c lighting instruction unit (irradiation control unit), 50 light device (irradiation unit), 140 lighting control device (irradiation control device), 141 integrated discrimination MPU (acquisition unit), 143 light control MPU, 143a lighting discrimination unit (discrimination unit), 143b lighting DB (database), 143c lighting instruction unit (irradiation control unit), 150 light device (irradiation unit)

The invention claimed is:

1. An irradiation control device, which is configured to control irradiation of light indicating a predetermined intention to a surrounding person,
    the irradiation control device comprising:
    an irradiation controller configured to perform control to irradiate a first irradiation element and a second irradiation element, the second irradiation element indicating the predetermined intention of the irradiation and the first irradiation element indicating information related to the predetermined intention,
    wherein the irradiation controller is configured to perform control of the first irradiation element and the second irradiation element such that the predetermined intention is always displayed to the surrounding person.

2. An irradiation control device, which is configured to control irradiation of light indicating a predetermined intention to a surrounding person,
    the irradiation control device comprising:
    an irradiation controller configured to perform control to irradiate a first irradiation element, and a second irradiation element, which is irradiated when the first irradiation element is extinguished, and indicates an intention of the irradiation,
    wherein the irradiation controller is configured to perform control such that the first irradiation element is again irradiated when the second irradiation element is extinguished,
    the irradiation control device further comprising:
    an acquirer configured to acquire discrimination information for performing irradiation control; and
    a discriminator configured to discriminate irradiation content based on the discrimination information acquired by the acquirer,
    wherein the irradiation controller is configured to control irradiation of light by specifying the first irradiation element and the second irradiation element in accordance with the irradiation content discriminated by the discriminator.

3. The irradiation control device according to claim 2,
    wherein the irradiation control device is mounted to a vehicle,
    wherein the irradiation control device further comprises a database storing information on irradiation content,
    wherein the acquirer is configured to acquire information on an operation or a state of the vehicle as the discrimination information, and
    wherein the discriminator is configured to discriminate the irradiation content by referring to the information on the irradiation content stored in the database based on the discrimination information acquired by the acquirer.

4. The irradiation control device according to claim 2,
    wherein the irradiation control device is mounted to a facility to be used by a user,
    wherein the irradiation control device further comprises a database storing information on irradiation content,
    wherein the acquirer is configured to acquire, as the discrimination information, peripheral information on movement of a user from a state detection sensor arranged in the facility, and
    wherein the discriminator is configured to discriminate the irradiation content by referring to the information on the irradiation content stored in the database based on the discrimination information acquired by the acquirer.

5. The irradiation control device according to claim 2,
    wherein the discriminator is configured to determine, based on the discrimination information, a peripheral environmental state under which light indicating the predetermined intention to a surrounding person is to be irradiated, and an attribute of a user who views the irradiated light, and
    wherein the irradiation controller is configured to control irradiation by adjusting at least one of a display timing, a display brightness, a display color, a display position, and a display size, which are adjustable elements of the first irradiation element and the second irradiation element, based on the peripheral environmental state and the attribute determined by the discriminator.

6. The irradiation control device according to claim 3,
    wherein the discriminator is configured to determine, based on the discrimination information, a peripheral environmental state under which light indicating the predetermined intention to a surrounding person is to be irradiated, and an attribute of a user who views the irradiated light, and
    wherein the irradiation controller is configured to control irradiation by adjusting at least one of a display timing, a display brightness, a display color, a display position, and a display size, which are adjustable elements of the first irradiation element and the second irradiation element, based on the peripheral environmental state and the attribute determined by the discriminator.

7. The irradiation control device according to claim 4,
    wherein the discriminator is configured to determine, based on the discrimination information, a peripheral environmental state under which light indicating the predetermined intention to a surrounding person is to be irradiated, and an attribute of a user who views the irradiated light, and
    wherein the irradiation controller is configured to control irradiation by adjusting at least one of a display timing, a display brightness, a display color, a display position, and a display size, which are adjustable elements of the first irradiation element and the second irradiation element, based on the peripheral environmental state and the attribute determined by the discriminator.

8. The irradiation control device according to claim 1, further comprising:
an irradiator configured to irradiate light based on control of the irradiation controller.

9. The irradiation control device according to claim 1, wherein the irradiation controller is configured to control irradiation such that the second irradiation element is constantly irradiated.

10. The irradiation control device according to claim 1, wherein the first irradiation element includes a plurality of elements, and
wherein the irradiation controller is configured to control irradiation such that the plurality of irradiation elements increase by one, and to control irradiation such that the first irradiation element is extinguished after all of the plurality of irradiation elements are irradiated.

11. The irradiation control device according to claim 1, wherein the first irradiation element includes an irradiation element indicating a direction, and
wherein the irradiation controller is configured to slide the first irradiation element in a direction indicating the direction.

12. An irradiation control device, which is configured to control irradiation of light indicating a predetermined intention to a surrounding person,
the irradiation control device comprising an irradiation controller configured to perform control to irradiate a first irradiation element, and a second irradiation element, which is irradiated when the first irradiation element is extinguished, and indicates an intention of the irradiation,
the irradiation control device further comprising:
an acquirer configured to acquire discrimination information for performing irradiation control;
a discriminator configured to discriminate irradiation content based on the discrimination information acquired by the acquirer; and
a database storing information on irradiation content,
wherein the irradiation controller is configured to control irradiation of light by specifying the first irradiation element and the second irradiation element in accordance with the irradiation content discriminated by the discriminator,
wherein the irradiation control device is mounted to a facility to be used by a user,
wherein the acquirer is configured to acquire, as the discrimination information, peripheral information on movement of a user from a state detection sensor arranged in the facility, and
wherein the discriminator is configured to discriminate the irradiation content by referring to the information on the irradiation content stored in the database based on the discrimination information acquired by the acquirer.

13. The irradiation control device according to claim 12, wherein the discriminator is configured to determine, based on the discrimination information, a peripheral environmental state under which light indicating the predetermined intention to a surrounding person is to be irradiated, and an attribute of a user who views the irradiated light, and wherein the irradiation controller is configured to control irradiation by adjusting at least one of a display timing, a display brightness, a display color, a display position, and a display size, which are adjustable elements of the first irradiation element and the second irradiation element, based on the peripheral environmental state and the attribute determined by the discriminator.

14. The irradiation control device according to claim 12, further comprising an irradiator configured to irradiate light based on control of the irradiation controller.

15. The irradiation control device according to claim 12, wherein the irradiation controller is configured to control irradiation such that the second irradiation element is constantly irradiated.

16. The irradiation control device according to claim 12, wherein the first irradiation element includes a plurality of elements, and
wherein the irradiation controller is configured to control irradiation such that the plurality of irradiation elements increase by one, and to control irradiation such that the first irradiation element is extinguished after all of the plurality of irradiation elements are irradiated.

17. The irradiation control device according to claim 12, wherein the first irradiation element includes an irradiation element indicating a direction, and
wherein the irradiation controller is configured to slide the first irradiation element in a direction indicating the direction.

18. An irradiation method for irradiating light indicating a predetermined intention to a surrounding person, the irradiation method comprising:
irradiating only a first irradiation element;
irradiating a second irradiation element, which is irradiated when the first irradiation element is extinguished, and indicates an intention of the irradiation; and
irradiating a third irradiation element and the first irradiation element simultaneously when the second irradiation element is extinguished.

19. An irradiation method for irradiating light indicating a predetermined intention to a surrounding person, the irradiation method comprising:
irradiating a first irradiation element; and
irradiating a second irradiation element, which is irradiated when the first irradiation element is extinguished, and indicates an intention of the irradiation,
the irradiation control method further comprising:
to acquire discrimination information for performing irradiation control;
to discriminate irradiation content based on the acquired discrimination information; and
to control irradiation of light by specifying the first irradiation element and the second irradiation element in accordance with the irradiation content discriminated by the discriminator,
to acquire, as the discrimination information, peripheral information on movement of a user from a state detection sensor arranged in a facility, and
to discriminate the irradiation content by referring to the information on the irradiation content stored in a database based on the acquired discrimination information.

* * * * *